United States Patent
Aziz et al.

(10) Patent No.: US 12,146,072 B2
(45) Date of Patent: Nov. 19, 2024

(54) METHOD FOR PRODUCING ANTI-CORROSION COMPOSITE COATING

(71) Applicant: KING FAHD UNIVERSITY OF PETROLEUM AND MINERALS, Dhahran (SA)

(72) Inventors: Md. Abdul Aziz, Dhahran (SA); Shaik Inayath Basha, Dhahran (SA); Mohammed Maslehuddin, Dhahran (SA); Shamsad Ahmad, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 236 days.

(21) Appl. No.: 17/896,205

(22) Filed: Aug. 26, 2022

(65) Prior Publication Data
US 2024/0067832 A1    Feb. 29, 2024

(51) Int. Cl.
| C09D 5/08 | (2006.01) |
| C08G 59/24 | (2006.01) |
| C08G 59/50 | (2006.01) |
| C08K 3/04 | (2006.01) |
| C09C 1/44 | (2006.01) |

(Continued)

(52) U.S. Cl.
CPC .......... C09D 5/084 (2013.01); C08G 59/245 (2013.01); C08G 59/5006 (2013.01); C08K 3/04 (2013.01); C09C 1/44 (2013.01); C09C 3/041 (2013.01); C09D 163/00 (2013.01)

(58) Field of Classification Search
CPC .............. C08K 3/04; C09C 3/041; C09C 1/44
See application file for complete search history.

(56) References Cited

U.S. PATENT DOCUMENTS

| 11,261,094 B2 | 3/2022 | Wu et al. |
| 2022/0087237 A1 | 3/2022 | Wilson et al. |

FOREIGN PATENT DOCUMENTS

| GB | 2 041 783 A | 9/1980 |
| IN | 201911045423 A | 5/2021 |
| JP | 6244284 B2 | 12/2017 |

OTHER PUBLICATIONS

Shah et al. Jute Sticks Derived and Commercially Available Activated Carbons for Symmetric Supercapacitors with Bio-electrolyte: A Comparative Study, Synthetic Metals 277 (2021) 116765 (Year: 2021).*

(Continued)

*Primary Examiner* — Kelly M Gambetta
(74) *Attorney, Agent, or Firm* — Oblon, McClelland, Maier & Neustadt, L.L.P.

(57) ABSTRACT

A method for producing a submicron-/nano-jute carbon/epoxy composite anti-corrosion coating is described. The method includes heating a jute stick, grinding the jute stick to form a first powder; pyrolyzing the first powder to form a pyrolyzed carbon; grinding the pyrolyzed carbon to form a second powder; ball milling the second powder under the wet conditions to form a submicron-/nano-jutecarbon; mixing the submicron-/nano-jutecarbon, and an epoxy resin to form a first mixture; mixing a hardener with the first mixture to form a second mixture, and coating the second mixture on a mild steel substrate and curing to form the submicron-/nano-jutecarbon/epoxy composite anti-corrosion coating.

20 Claims, 27 Drawing Sheets

(51) Int. Cl.
C09C 3/04 (2006.01)
C09D 163/00 (2006.01)

(56) References Cited

OTHER PUBLICATIONS

Li, Z., Ravenni, G., Bi, H., Weinell, C. E., Ulusoy, B., Zhang, Y., & Dam-Johansen, K. (2021). Effects of Biochar Nanoparticles on Anticorrosive Performance of Zinc-rich Epoxy Coatings. Progress in Organic Coatings, 158, Article 106351. https://doi.org/10.1016/j.porgcoat.2021.106351 (Year: 2021).*

Chen et al. Nanoporous Carbon Produced by Ball Milling, Applied Physics Letters, vol. 74, No. 19 (Year: 1999).*

Tencan, Zirconia Mill Ball, http://www.lab-mills.com/ball-mill-medias/zirconia.html (published 2020, accessed Jun. 13, 2024) (Year: 2020).*

Jay M. Korde, et al., "Corrosion inhibition of 316L-type stainless steel under marine environments using epoxy/waste plastic soot coatings", SN Applied Sciences, vol. 2, Article No. 1267, Jun. 23, 2020, 13 pages.

Obaid ur Rahman, et al., "Lignin nanoparticles: synthesis, characterization and corrosion protection performance", New Journal of Chemistry, vol. 42, Issue 5, Jan. 19, 2018, pp. 3415-3425 (Abstract only).

* cited by examiner

Neat epoxy coating

Composite epoxy coating

METHOD FOR PRODUCING ANTI-CORROSION COMPOSITE COATING

STATEMENT OF PRIOR DISCLOSURE BY AN INVENTOR

Aspects of the present disclosure are described in S. Basha; "Preparation, Characterization, and Evaluation of the Anticorrosion Performance of Submicron/Nanocarbon from Jute Sticks"; Sep. 16, 2021; Chemistry—An Asian Journal, incorporated herein by reference in its entirety.

BACKGROUND

Technical Field

The present disclosure is directed to corrosion chemistry, particularly to a submicron/nano jute carbon/epoxy composite anti-corrosion coating, and the method of preparation thereof.

Description of Related Art

The "background" description provided herein is to generally present the context of the disclosure. Work of the presently named inventors, to the extent it is described in this background section, as well as aspects of the description that may not otherwise qualify as prior art at the time of filing, are neither expressly nor impliedly admitted as prior art against the present invention.

Corrosion, a naturally occurring phenomenon, deteriorates steel structures exposed to a severe environment. Metallic corrosion is an electrochemical process in which a metal is converted into its oxide state in the presence of moisture and oxygen. The process of corrosion is accelerated in severe exposure conditions, such as high temperature, humidity, acidity, and salinity. The global annual economic loss due to corrosion is estimated to be around $2.5 trillion, which is around 3.4% of the global gross domestic product (GDP). However, the global annual loss can be controlled to some extent by adopting corrosion protection strategies, such as using protective coatings, appropriate selection of materials and design, and by limiting the exposure of metals to corrosive species.

One of the methods of protecting the metal from corrosion is by applying a protective/barrier coating to prevent the ingress of corrosive species to the metal surface. Polymeric coatings are most commonly used for protecting metallic surfaces from corrosion. Although these types of coatings are strong and efficient, they are susceptible to degradation in the long run or under severe exposure conditions. In the long run, the failure of protective coatings facilitates the ingress of moisture and other harmful species to the metal surface leading to corrosion. Therefore, there is an unmet need for improving the performance of protective coatings by modification or addition of appropriate materials. The improved corrosion resistance of a composite coating results in the increased service-life of structures leading to economic and environmental benefits.

In view of the forgoing, one objective of the present disclosure is to provide a submicron-/nano-jute carbon/epoxy composite anti-corrosion coating and a method for making thereof.

SUMMARY

In an exemplary embodiment, a method for producing a submicron-/nano-jute carbon/epoxy composite anti-corrosion coating is described. The method includes heating a jute stick at 60 to 150 degrees centigrade (° C.) for 6 to 28 hours and grinding the jute stick to form a first powder. The method further includes pyrolyzing the first powder at 500 to 1000° C. to form a pyrolyzed carbon and grinding the pyrolyzed carbon to form a second powder. The method further includes ball milling the second powder at 1500 to 5000 revolutions per minute (rpm) speed for 8 to 30 hours under wet condition to form a submicron-/nano-jute carbon, mixing the submicron-/nano-jute with an epoxy resin to form a first mixture, mixing a hardener with the first mixture to form a second mixture, and coating the second mixture on a mild steel substrate and cured to form the submicron-/nano-jute carbon/epoxy composite anti-corrosion coating.

In some embodiment, the first powder is pyrolyzed for 3 to 10 hours.

In some embodiments, the second powder contains 92 to 97% carbon (C), 2.8 to 4.8% oxygen (O), 0.08 to 0.21% magnesium (Mg), 1.1 to 2.1% aluminium (Al), and 0.11 to 0.25% calcium (Ca).

In some embodiments, the second powder is ball milled as a mixture with ethanol.

In some embodiments, the second powder is ball milled with zirconium dioxide ($ZrO_2$) balls having 400-800 micron diameters. A mass ratio of the second powder to $ZrO_2$ balls is 1:30 to 1:10.

In some embodiments, the submicron-/nano-jute carbon is amorphous, the submicron-/nano-jute carbon has a mean particle size of 500 nm to 2 μm, and particles of the submicron-/nano-jute carbon have a major flat surface having a surface area of 2-40% of the total surface area of the particle.

In some embodiments, the first mixture includes 0.1 to 2.0 weight percentage (wt. %) of the submicron-/nano-jute carbon relative to a total weight of the first mixture.

In some embodiments, the epoxy resin is at least one selected from the group consisting of a glycidyl-ether, a glycidyl-ester, a glycidyl-amine, an aliphatic epoxy resin, or a cycloaliphatic epoxy resin.

In some embodiments, the epoxy resin is bisphenol A diglycidyl ether-based epoxy.

In some embodiments, the hardener is at least one selected from the group consisting of an amine, a polyamide, a phenolic resin, an anhydride, an isocyanate, or a polymer-captan.

In some embodiments, the hardener is a polyoxyalkylene amine-based hardener.

In some embodiments, a mass ratio of the first mixture to the hardener is 0.5:1.7 to 1.7:0.5.

In some embodiments, the submicron-/nano-jute carbon/epoxy composite anti-corrosion coating has a mean thickness of 90 to 180 μm.

In some embodiments, the submicron-/nano-jute carbon/epoxy composite anti-corrosion coating has a corrosion resistance of $10^6$ to $10^{12}$ Ohm per square centimeter (Ω $cm^2$).

In some embodiments, the submicron-/nano-jute carbon/epoxy composite anti-corrosion coating has a corrosion current density of 0.5 to 1.5 nano Amperes per square centimeter ($nA/cm^2$).

In some embodiment, the submicron-/nano-jute carbon/epoxy composite anti-corrosion coating has 80 to 95% higher corrosion protection efficiency compared to an epoxy coating that is same as the submicron-/nano-jute carbon/ epoxy composite anti-corrosion coating but does not contain the submicron-/nano-jute carbon.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
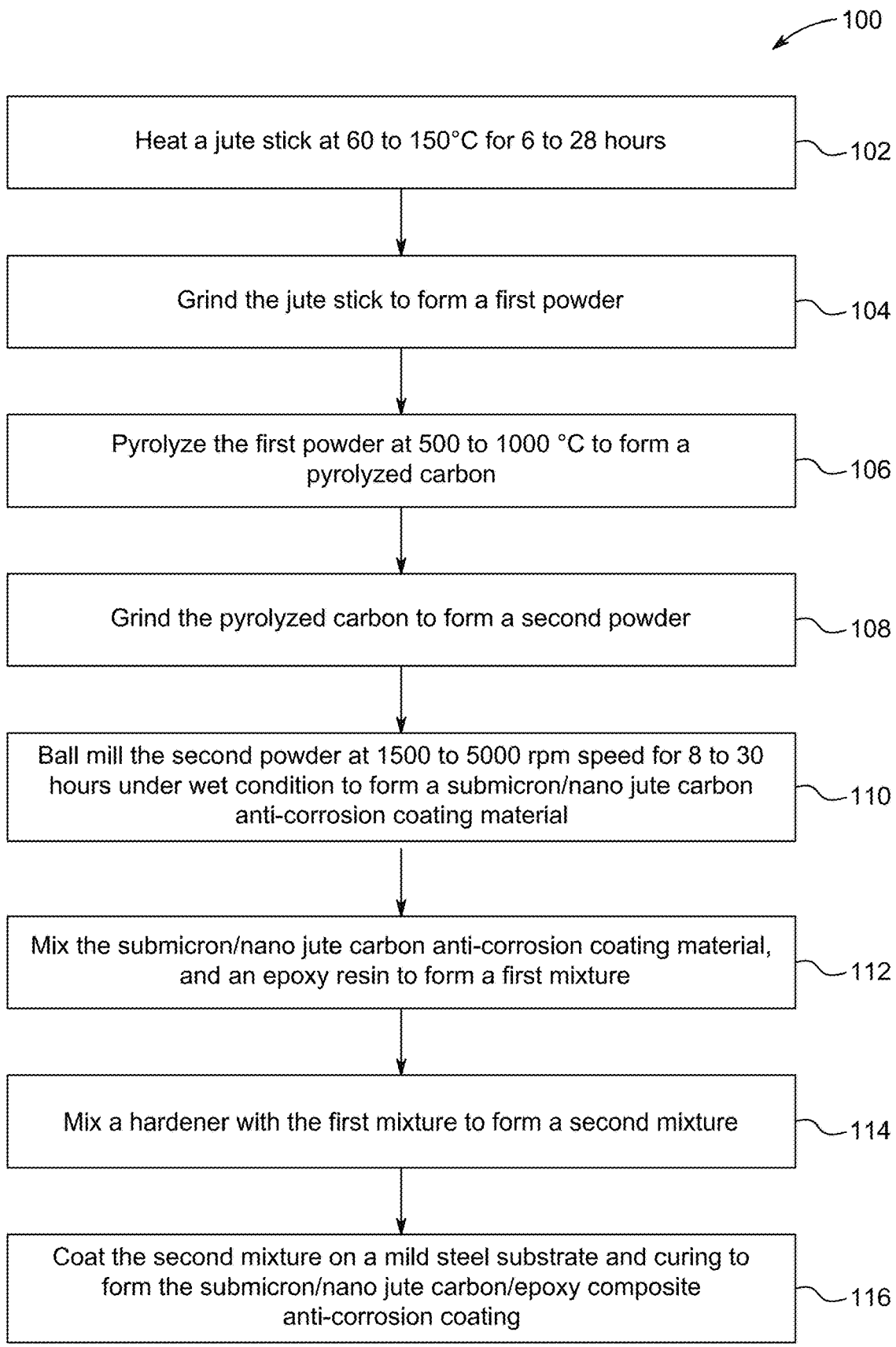
FIG. 1 is a schematic diagram of a method for producing a submicron-/nano-jute carbon/epoxy composite anti-corrosion coating, according to certain embodiments.

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "submicron" refers to an object which is smaller than a micro meter.

As used herein, the term "corrosion" refers to a natural process that converts a refined metal into a more chemically stable oxide.

As used herein, the term "pyrolyzing" or "pyrolyzed" refers to the thermal decomposition of materials at elevated temperatures in an inert atmosphere.

As used herein, the term "ball milling" refers to a grinding method that grinds materials into extremely fine powders.

Aspects of the present disclosure are directed to a method for producing a submicron-/nano-jute carbon/epoxy composite anti-corrosion coating. The submicron-/nano-carbon from jute sticks is used to provide a low-cost and highly corrosion-resistant composite coating. The submicron-/nano-carbon is produced by pyrolysis and ball milling and is characterized using various analytical techniques, such as FESEM, TEM, XRD, XPS and Raman spectroscopic techniques. The corrosion performance of the composite epoxy/submicron-/nano-jute carbon coating was investigated through EIS, potentiodynamic polarization (PDP), and salt spray techniques. The corrosion measurements were conducted on mild steel (MS) plates coated with a mixture of epoxy resin and the submicron/nano-jute carbon. The electrochemical impedance of the steel coated with the composite coating is an order of two magnitudes more than that of the specimen coated with neat epoxy. Consequently, the corrosion rate of specimens coated with the composite coating is 13-20 times less than that of steel coated with neat epoxy coating. The salt spray results also indicate an improvement in the corrosion resistance of the composite coating compared with the neat epoxy.

Referring to FIG. 1, a schematic flow diagram of a method 100 for producing the submicron-/nano-jute carbon/epoxy composite anti-corrosion coating is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

In an embodiment, the submicron-/nano-jute carbon is amorphous.

In an embodiment, the particles of the submicron-/nano-ute carbon have a major flat surface having a surface area of 1-50%, preferably 1-48%, preferably 1-46%, preferably 1-44%, preferably 1-42%, preferably 2-40% of the total surface area of the particle.

In an embodiment, the submicron-/nano-jute carbon has a mean particle size of 100 nm to 10 μm, preferably 200 nm to 5 μm, preferably 300 nm to 4 μm, preferably 400 nm to 3 μm, preferably 500 nm to 2 μm.

In an embodiment, the submicron-/nano-jute carbon epoxy composite anti-corrosion coating has a mean thickness of 50 to 250 μm, preferably 60 to 200 μm, preferably 70 to 190 μm, preferably 90 to 180 μm.

In some embodiments, the submicron-/nano-jute carbon/epoxy composite anti-corrosion coating has a corrosion resistance of $10^3$ to $10^{13}$ Ω·cm$^2$, preferably $10^4$ to $10^{12}$ Ω·cm$^2$, preferably $10^5$ to $10^{12}$ Ω·cm$^2$, preferably $10^6$ to $10^{12}$ Ω·cm$^2$.

In some embodiments, the submicron-/nano-jute carbon/epoxy composite anti-corrosion coating has a corrosion current density of 0.1 to 2.5 nA/cm$^2$, preferably 0.2 to 2.0 nA/cm$^2$, preferably 0.5 to 1.5 nA/cm$^2$.

In some embodiments, the submicron-/nano-jute carbon/epoxy composite: anti-corrosion coating has 60 to 99%, preferably 65 to 99%, preferably 70 to 99%, preferably 80 to 97%, preferably 80 to 95% higher corrosion protection efficiency in comparison to an epoxy coating that is same as the submicron-/nano-jute carbon/epoxy composite anti-corrosion coating but does not contain the submicron-/nano-jute carbon.

At step 102, the method 100 includes heating a jute stick at 60 to 150 degrees centigrade (° C.) for 6 to 28 hours. In some embodiments, the raw jute sticks are chopped into small pieces, cleaned with de-ionized water to remove any dust or foreign matter, and subsequently heated at 50 to 250° C., preferably 60 to 210° C., preferably 70 to 200° C., preferably 90 to 180° C., preferably 100 to 150° C., preferably 100 to 130° C., preferably for 110° C. for 18 to 30 hours, preferably 20 to 28 hours, preferably 21 to 26 hours, preferably 24 hours for the removal of moisture.

At step 104, the method 100 includes grinding the jute stick to form a first powder.

At step 106, the method 100 includes pyrolyzing the first powder at 300 to 1500° C., preferably 400 to 1300° C., preferably 500 to 1200° C., preferably 500 to 1100° C., preferably 500 to 1000° C. to form a pyrolyzed carbon. In some embodiments, the first powder is pyrolyzed for 1 to 20 hours, preferably 2 to 15 hours, preferably 3 to 12 hours, preferably 3 to 10 hours at a heating 20 rate of 1 to 50° C./min, preferably 2 to 40° C./min, preferably 3 to 30° C./min, preferably 4 to 25° C./min, preferably 5 to 20° C./min. In another embodiment, the cleaned and dried jute sticks are then ground to form the first powder and pyrolyzed at 300 to 1500° C., preferably 400 to 1300° C., preferably 500 to 1200° C., preferably 600 to 1100° C., preferably 700 to 1000° C., preferably 700 to 900° C., preferably 850° C. in a tubular furnace under nitrogen atmosphere for about 1 to 10 hours, preferably 2 to 8 hours, preferably 5 hours at a heating rate of 2 to 20° C./min, preferably 5 to 15° C./min, preferably 10° C./min and a cooling rate of 1 to 10° C./min, preferably 2 to 9° C./min, preferably 3 to 8° C./min, preferably 5° C./min. The quantity of the carbon obtained after pyrolysis is around 1 to 40%, preferably 10 to 30%, preferably 15 to 25%, preferably 20% of the initial weight of jute stick powder.

At step 108, the method 100 includes grinding the pyrolyzed carbon to form a second powder. The second powder has 85 to 99%, preferably 87 to 98%, preferably 90 to 98%, preferably 92 to 97% carbon (C), 1 to 10%, preferably 1 to 8%, preferably 2 to 6%, preferably 2.8 to 4.8% oxygen (O), 0.01 to 1%, preferably 0.02 to 0.8%, preferably 0.04 to 0.6%, preferably 0.08 to 0.21% magnesium (Mg), 0.5 to 5%, preferably 0.8 to 3%, preferably 1.1 to 2.1% aluminum (Al), and 0.05 to 1%, preferably 0.10 to 0.5%, preferably 0.10 to 0.3%, preferably 0.11 to 0.25% calcium (Ca). In another embodiment, the pyrolyzed carbon is further ground to a fine powder using a kitchen grinder or a mixer for 1 to 10 min, preferably 2 to 8 min, preferably 5 min.

At step 110, the method 100 includes ball milling the second powder at 1000 to 8000 revolutions per minute (rpm), 1300 to 7000 rpm, preferably 1400 to 6000 rpm, preferably 1500 to 5000 rpm speed for 1 to 60 hours, preferably 2 to 50 hours, preferably 3 to 40 hours, preferably 5 to 35 hours, preferably 8 to 30 hours under wet condition to form a submicron-/nano-jute carbon. In an embodiment, the submicron-/nano-jute carbon, and an epoxy resin is mixed to form a first mixture. In an embodiment, a hardener is mixed with the first mixture to form a second mixture. In an embodiment, the second mixture is coated on a mild steel substrate and cured to form the submicron-/nano-jute carbon/epoxy composite anti-corrosion coating. In one embodiment, the second powder is ball milled as a mixture in the presence of a solvent. The solvent may be an organic solvent or water. In some embodiments, the solvent is an organic solvent or water. The water may be tap water, distilled water, double distilled water, deionized water, deionized distilled water, reverse osmosis water, and/or some other water. In one embodiment the water is double distilled to eliminate trace metals. Preferably the water is double distilled, deionized, deionized distilled, or reverse osmosis water and at 25° C. has a conductivity of less than 10 µS·cm$^{-1}$, preferably less than 1 µS·cm$^{-1}$, a resistivity greater than 0.1 MΩ·cm, preferably greater than 1 MΩ·cm, more preferably greater than 10 MΩ·cm, a total solid concentration of less than 5 mg/kg, preferably less than 1 mg/kg, and a total organic carbon concentration less than 1000 µg/L, preferably less than 200 µg/L, more preferably less than 50 µg/L. Exemplary of the organic solvent that may be used include alcohols, aliphatic hydrocarbons, aromatic hydrocarbons, amines, esters, ethers, ketones, and nitrated or chlorinated hydrocarbons. In some embodiments, the solvent is ethanol. In another embodiment, the second powder is ball milled with zirconium dioxide ($ZrO_2$) balls having 100 to 1200 micron diameters, preferably 200 to 1000 micron diameters, preferably 400-800 micron diameters. In an embodiment, a mass ratio of the second powder to $ZrO_2$ balls is 1:50 to 1:5, preferably 1:40 to 1:7, preferably 1:35 to 1:9, preferably 1:30 to 1:10. In another embodiment, the obtained carbon upon grinding is termed as grinded jute carbon. In an embodiment, fine grinded jute carbon is subjected to high-energy ball milling under wet conditions at 1000 to 6000 rpm, preferably 2000 to 5000 rpm, preferably 2500 to 4000 rpm, preferably 3000 rpm speed to obtain submicron-/nano-jute carbon. The ball milling is carried out for 8 to 25 hours, preferably 10 to 20 hours, preferably 15 hours while measuring the size at different time intervals of 5, 10 and 15 hours using FESEM. The zirconia ($ZrO_2$) balls of 600 micron diameter is used at 1:20 (mass to mass) ratio of carbon to zirconia balls.

At step 112, the method 100 includes mixing the submicron/nano jute carbon with an epoxy resin to form a first mixture. The first mixture includes 0.05 to 5 wt. %, preferably 0.08 to 4 wt. %, preferably 0.1 to 3 wt. %, preferably 0.1 to 2 wt. % of the submicron-/nano-jute carbon relative to a total weight of the first mixture. In some embodiments, the epoxy resin is at least one selected from the group consisting of a glycidyl-ether, a glycidyl-ester, a glycidyl-amine, an aliphatic epoxy resin, or a cycloaliphatic epoxy resin. In some embodiments, the epoxy resin is a bisphenol A diglycidyl ether-based epoxy.

At step 114, the method 100 includes mixing a hardener with the first mixture to form a second mixture. In some embodiments, the hardener is at least one selected from the group consisting of an amine, a polyamide, a phenolic resin, an anhydride, an isocyanate, or a polymercaptan. In some embodiments, the hardener is a polyoxyalkylene amine-based hardener.

In some embodiments, a mass ratio of the first mixture to the hardener is 0.1:4 to 4:0.1, preferably 0.2:3 to 3:0.2, preferably 0.3:2 to 2:0.3, preferably 0.5:1.7 to 1.7:0.5. In another embodiment, the hardener is added at 1:1 ratio (mass) and mixed uniformly for about 1 to 10 min, preferably 2 to 8 min, preferably 2-3 min.

At step 116, the method 100 includes coating the second mixture on a mild steel (MS) substrate and curing to form the submicron-/nano-jute carbon/epoxy composite anti-corrosion coating. In another embodiment, the composite coating is then applied on the mild steel (MS) substrate using a spray gun and cured for 40 to 100 hours, preferably 50 to 90 hours, preferably 60 to 80 hours, preferably 72 hours at 20 to 30° C.

In a preferred embodiment, the ball milled jute (i.e., the submicron/nano jute carbon) has a particle morphology such that a majority, preferably more than 60 wt. % or more than 70 wt. % of the ball milled jute particles have at least one major flat face (planar face) representing 15-50%, preferably 20-40% or about 30% of the total surface area of the particle. The flat face area can be determined by comparing the area of flat surfaces measured using optical spectroscopic techniques with the total surface area of the particle using (see O. P. Mills, et al., Geosphere, December 2010; v. 6; no. 6—incorporated herein by reference). Particles having a substantial flat face surface provide even settling and laminar-type orientation in the anti-corrosion coating. An ordered arrangement of particles also helps reduce corrosion by providing continuity in the orientation of the submicron-/nano-jutecarbon particles in the anti-corrosion coating, e.g., by providing conduction paths parallel to the surface of a coated steel.

EXAMPLES

The following examples demonstrate the method for producing the submicron-/nano-jute carbon/epoxy composite anti-corrosion coating described herein. The examples are provided solely for illustration and are not to be construed as limitations of the present disclosure, as many variations thereof are possible without departing from the spirit and scope of the present disclosure.

Materials

The jute sticks used in the present study were obtained from the jute fields of Bangladesh. The two-component epoxy resin (bisphenol A diglycidyl ether based-epoxy) and the hardener (polyoxyalkylene amine-based) were obtained from a local supplier. The mild steel (MS) plates of millimeters (mm) thickness were obtained from the local market.

Preparation of Submicron-/Nano-Jute Carbon

The procedure for the synthesis of submicron-/nano-jute carbon involved two stages, i.e., carbonization and ball milling. Firstly, the raw jute sticks were chopped into small pieces, cleaned with de-ionized (DI) water to remove any dust or foreign matter, and subsequently heated at 110° C. for 24 hours for the removal of moisture. The cleaned and dried jute sticks were then ground to powder and pyrolyzed at 850° C. in a tube furnace under a nitrogen atmosphere for about 5 hours at a heating rate of 10° C./min and a cooling rate of 5° C./min. The quantity of the carbon obtained after pyrolysis was around 20% of the initial weight of jute stick powder. The pyrolyzed carbon was further ground to a fine powder using a kitchen grinder for 5 mins. Thereafter, the finely grinded jute carbon was subjected to high-energy ball milling under wet conditions at 3000 rpm to obtain submicron-/nano-jute carbon. The zircona ($ZrO_2$) balls of 600-micron diameter were used at a 1:20 (mass to mass) ratio of carbon to zircona balls. Because the wet method of ball milling was adopted, 100 ml ethanol was added to the mix. The ball milling was carried out for 15 hours while measuring the size at different time intervals of 5, 10, and 15 hours using FESEM.

Preparation of Submicron-/Nano-Jute Carbon Composite Coating

Figure 2:
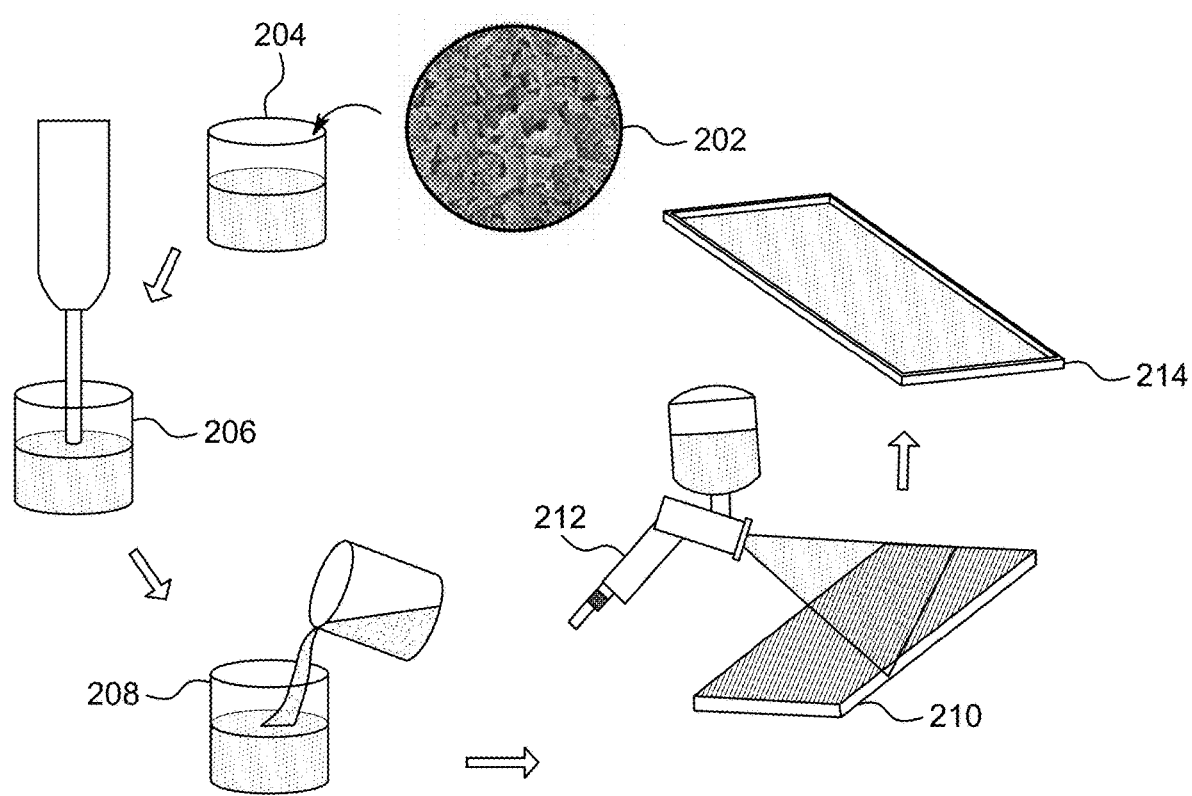
FIG. 2 is a schematic diagram showing preparation and application of a composite coating on a mild steel (MS) substrate, according to certain embodiments.

FIG. 2 depicts a procedure for the preparation and application of the composite coating on the mild steel (MS) substrate. The submicron-/nano-jute carbon 202 (obtained after 15 hours of ball milling of the grinded carbon) was added to a neat epoxy 204 at three different combinations, i.e., 0.25, 0.75, and 1.0 wt. % to develop composite epoxy coatings (EC 0.25%, EC 0.75%, and EC 1.0%) whereas neat epoxy coating was used as a reference. The viscosity of the epoxy resin was decreased using 2-butanone solvent at 10 wt. % of epoxy resin. The mixture was sonicated using an ultrasonic probe sonication 206, which is one of the best methods for dispersion of nanomaterials for about 10 mins at an amplitude of 60% and a temperature of 45° C. to achieve a uniform distribution of carbon particles in the epoxy. The hardener 208 was added at a 1:1 ratio (mass) and mixed uniformly for about 2-3 min. The composite coating was then applied on mild steel (MS) substrate 210 using a spray gun 212 and cured for 72 hours at room temperature. The MS surface was sand blasted and cleaned with acetone prior to coating 214. The coating thickness was measured using an ElecktroPhysik QuintSonic ultrasonic coating thickness measuring device. The average thickness of the coating was in the range of 110-140 µm.

Characterization

The ground and ball-milled jute carbon particles were characterized to assess their morphology using a FESEM, Lyra-3, Tescan and TEM (JEM-2011; JEOL). The elemental composition of jute carbon particles was determined using EDS, X-MaxN silicon drift detector, (Oxford Instruments, UK). A voltage of 20 kilovolts (kV) was adopted for all the SEM and EDS measurements. The crystal structural information was determined using XRD (MiniFlex, Rigaku). The diffractometer was operated at 0.15416 nm wavelength, 10 mA current, and 30 kV voltage. A Raman spectrophotometer (iHR320 imaging Spectrometer packaged with charge-coupled device ((CCD) detector, HORIBA) equipped with a 300 mW green laser was used to record the Raman spectra of the developed carbon with an excitation wave length of 532 nm at room temperature. A micro-focusing X-ray monochromator XPS (ESCALAB 250Xi XPS Microprobe, Thermo Scientific, USA) was used for the XPS analysis.

Corrosion-Resistance of Coatings

Figure 3:
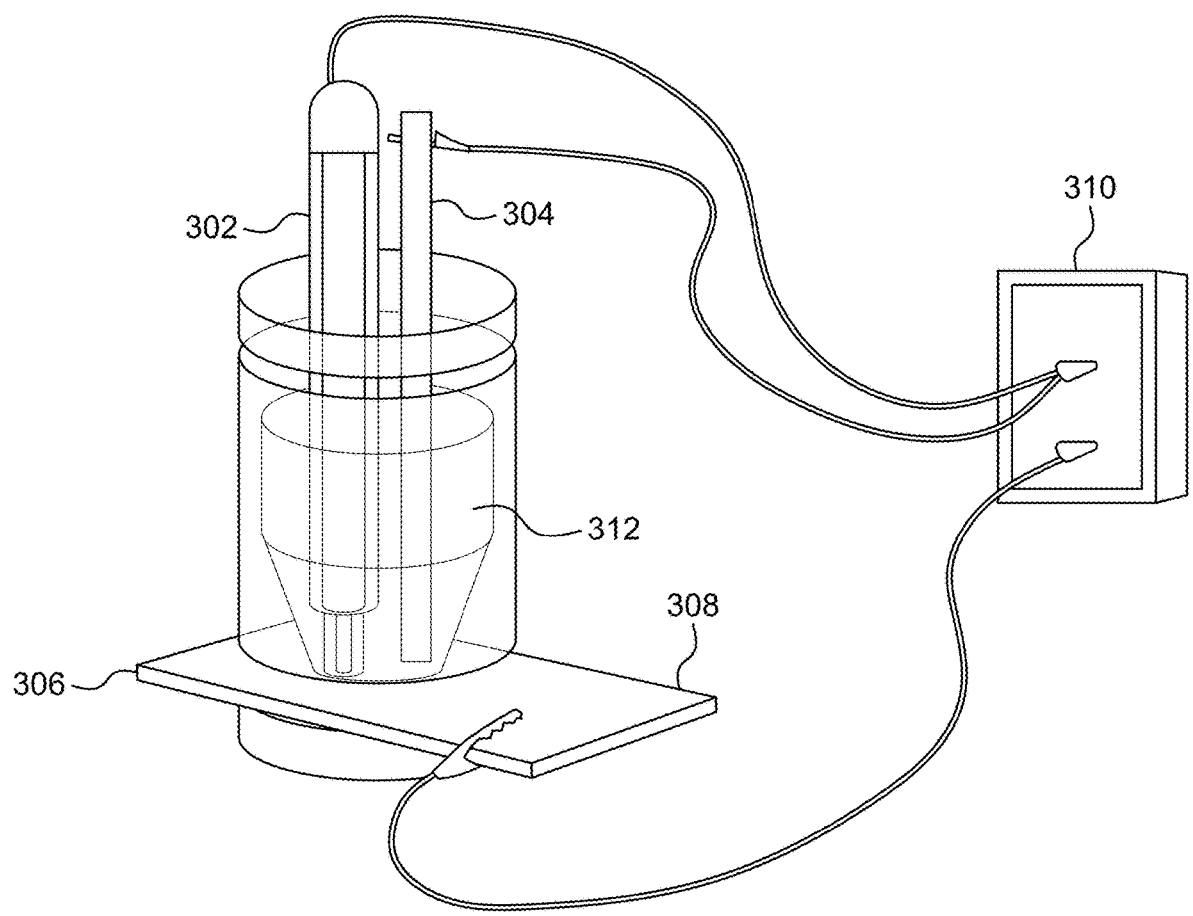
FIG. 3 illustrates an electrochemical cell used for corrosion evaluation of the coated specimens in 3.5% sodium chloride (NaCl) solution, according to certain embodiments.

The corrosion resistance of the submicron-/nano-jute carbon incorporated composite coatings was evaluated using EIS, and PDP. The coated steel specimens were also exposed to salt spray for 1,000 hours as per ASTM B117 to determine the corrosion resistance of neat and composite coatings on exposure to humid environments and ratings were given following the criteria provided in ASTM D1654. The EIS and PDP measurements were conducted using a three-electrode electrochemical cell shown in FIG. 3, wherein a saturated calomel electrode (SCE) was used as a reference electrode 302, a graphite rod was used as a counter electrode 304, and coated MS steel 306 specimen served as a working electrode 308. All EIS measurements were carried out at an AC voltage of 10 mV amplitude versus open circuit potential (OCP) over a frequency range of 100000 to 0.01 hertz (Hz) using Gamry 3000 Potentiostat/Galvanostat 310. The measurements were recorded on a sample area of 2.57 $cm^2$ exposed to 3.5% NaCl electrolyte 312. The Echem analyst software was used for fitting the obtained EIS data. The EIS measurements were conducted on three specimens and the average values are reported. The corrosion rate of MS specimens coated with the neat and composite coatings was determined using the PDP technique. The PDP measurements are conducted on coated specimens exposed to 3.5% NaCl solution for about 60 days, polarized from −0.9 V to +0.9 V at a scan rate of 0.25 mV/s using the Gamry Potentiostat/Galvanostat. The electrode system was similar to that used for EIS measurements. For repeatability, the test was performed on three specimens, and the mean values are reported.

Besides using electrochemical techniques, the corrosion evaluation of the coated specimens was investigated using the salt spray technique, which is a physical method of corrosion evaluation. The salt spray performance was conducted on coated MS steel specimens measuring 10×15×0.2 cm, coated with neat/composite coatings. The test specimens were exposed in the salt spray chamber for about 1000 hours as per the procedure outlined in ASTM B117, whereas the application of scribes on specimens and their corrosion performance was assessed as per the procedure outlined in ASTM D1654. After the salt spray exposure, the exposed specimens were removed, cleaned and photographed for visual evaluation. Finally, a qualitative performance rating was provided to each specimen as per the criteria provided in ASTM D1654.

FESEM and EDS Analysis

Figure 4C:
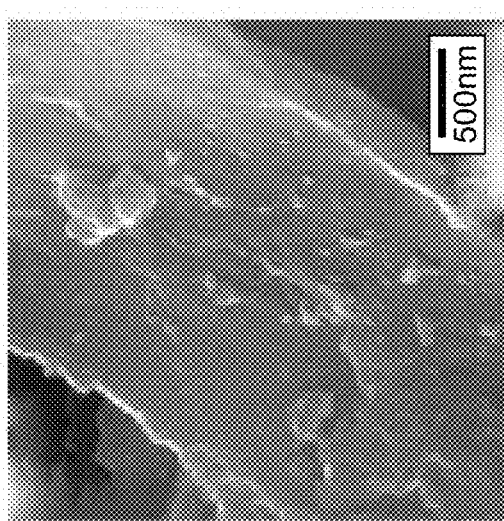
FIG. 4C illustrates the FESEM image of the grinded jute carbon, and the carbon obtained after ball milling at a 500 nanometers (nm) scale bar, according to certain embodiments.
Figure 4F:
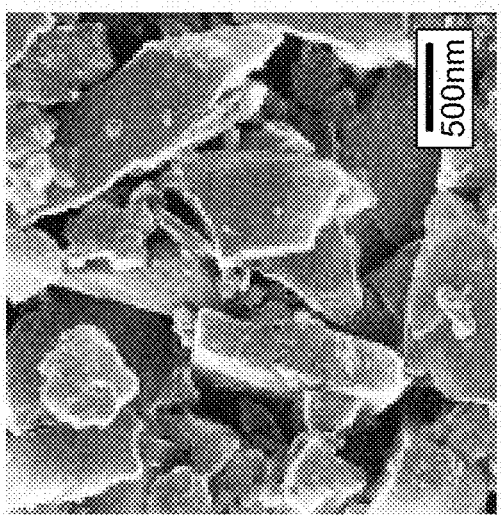
FIG. 4F illustrates the FESEM image of the grinded jute carbon, and the carbon obtained after ball milling at a 500 nm scale bar for 5 hours, according to certain embodiments.
Figure 4B:
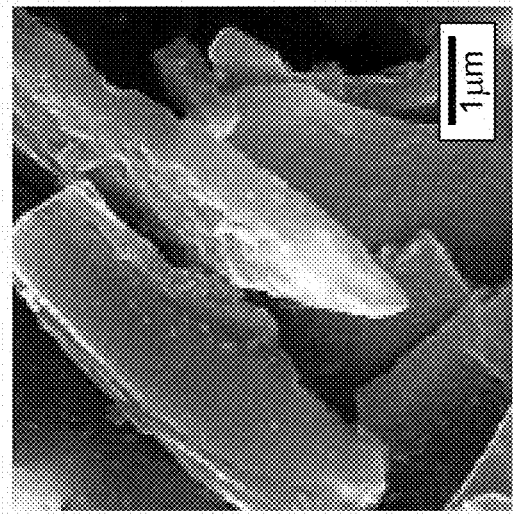
FIG. 4B illustrates the FESEM image of the grinded jute carbon, and the carbon obtained after ball milling at a 1 µm scale bar, according to certain embodiments.
Figure 4E:
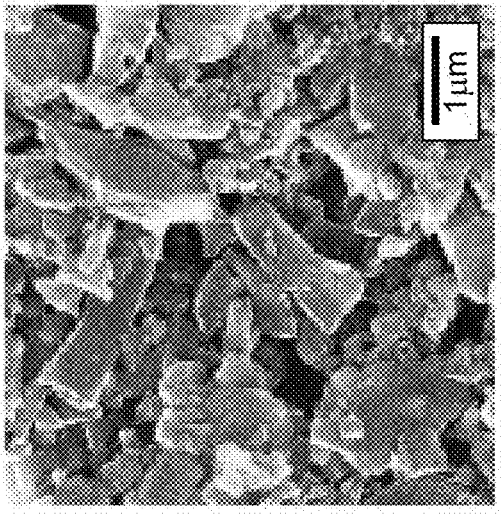
FIG. 4E illustrates the FESEM image of the grinded jute carbon, and the carbon obtained after ball milling at a 1 µm scale bar for 5 hours, according to certain embodiments.
Figure 4A:
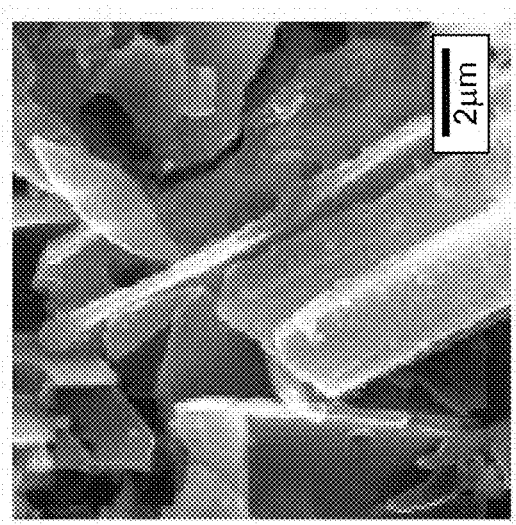
FIG. 4A illustrates a field emission scanning electron microscope (FESEM) image of a grinded jute carbon, and a carbon obtained after ball milling at a 2 micrometers (µm) scale bar, according to certain embodiments.
Figure 4D:
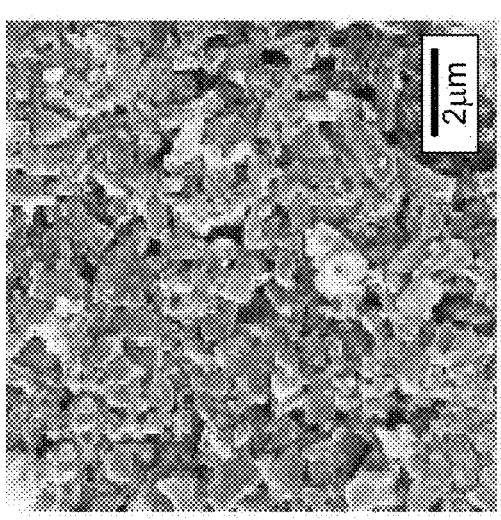
FIG. 4D illustrates the FESEM image of the grinded jute carbon, and the carbon obtained after ball milling at a 2 µm scale bar for 5 hours, according to certain embodiments.
Figure 4I:
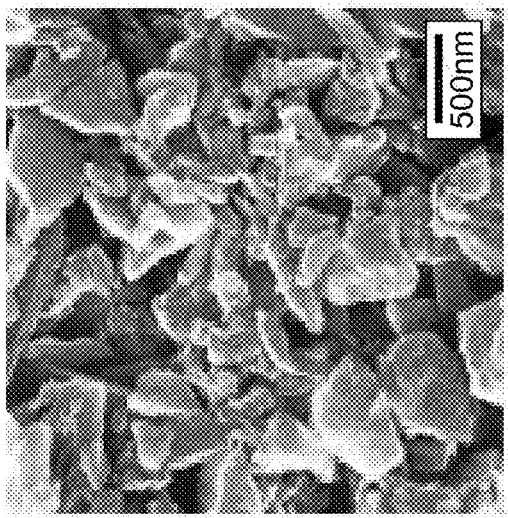
FIG. 4I illustrates the FESEM image of the grinded jute carbon, and the carbon obtained after ball milling at a 500 nm scale bar for 10 hours, according to certain embodiments.
Figure 4L:
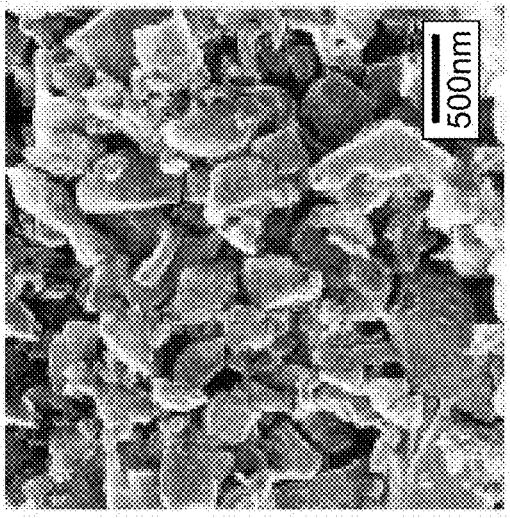
FIG. 4L illustrates the FESEM image of the grinded jute carbon, and the carbon obtained after ball milling at a 500 nm scale bar for 15 hours, according to certain embodiments.
Figure 4H:
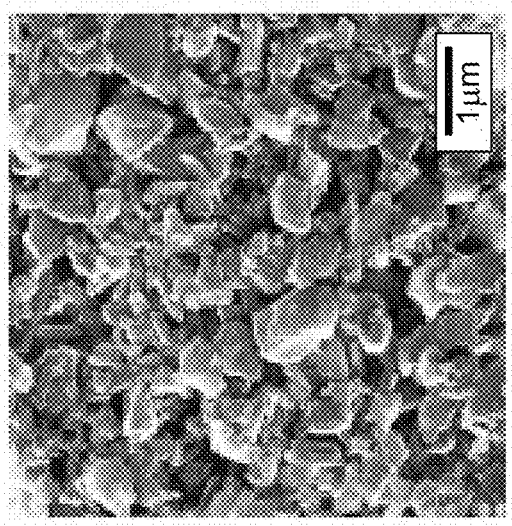
FIG. 4H illustrates the FESEM image of the grinded jute carbon, and the carbon obtained after ball milling at a 1 µm scale bar for 10 hours, according to certain embodiments.
Figure 4K:
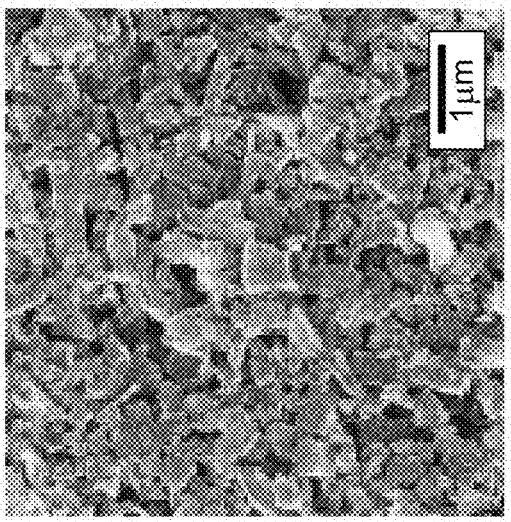
FIG. 4K illustrates the FESEM image of the grinded jute carbon, and the carbon obtained after ball milling at a 1 µm scale bar for 15 hours, according to certain embodiments.
Figure 4G:
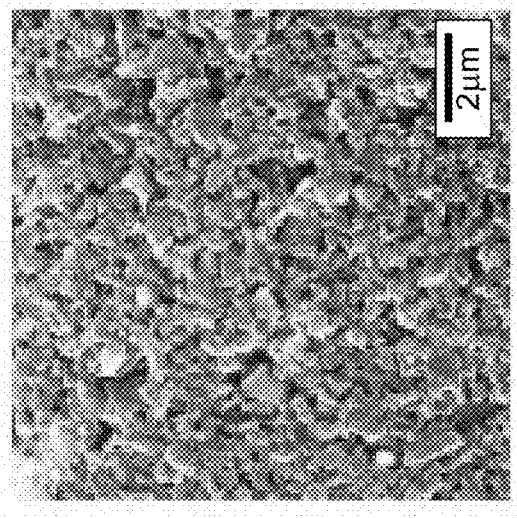
FIG. 4G illustrates the FESEM image of the grinded jute carbon, and the carbon obtained after ball milling at a 2 µm scale bar for 10 hours, according to certain embodiments.
Figure 4J:
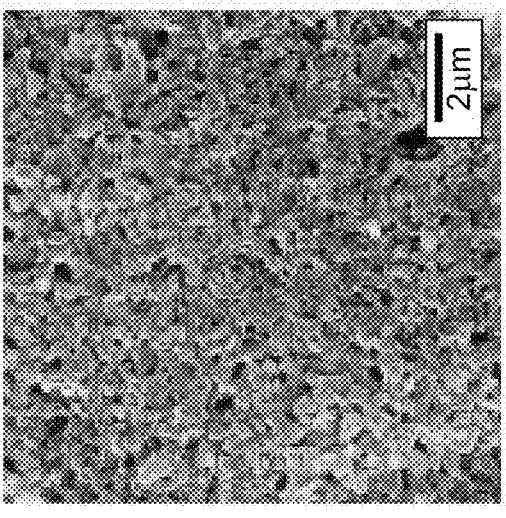
FIG. 4J illustrates the FESEM image of the grinded jute carbon, and the carbon obtained after ball milling at a 2 µm scale bar for 15 hours, according to certain embodiments.

The morphology of the grinded jute carbon and the ball-milled jute carbon was assessed using FESEM and is shown in FIGS. 4A-4L. FIGS. 4A-4C represent the FESEM images of the grinded jute carbon at three magnifications of 2 μm, 1 μm, and 500 nm scale bar, respectively. The carbon has a flaky/rectangular sheet type of structure with a typical particle size of 10-15 μm. FIGS. 4D-4F represent the FESEM images of grinded jute carbon after ball milling for 5 hours at three different magnifications of 2 μm, 1 μm, and 500 nm scale bar, respectively. It was clearly observed that the particle size has decreased significantly due to high energy ball milling. A typical measurement of the particle size from the FESEM image indicated a wide range of size variations as follows: 5%>2 μm, 60% in the range of 1-2μ, 26% in the range of 1-0.5 μm, 9%<500 nm. FIGS. 4G-4I represent the FESEM images of grinded jute carbon after ball milling for 10 hours at three magnifications of 2 μm, 1 μm, and 500 nm scale bar. A typical measurement of the particle size from the FESEM images indicated a wide range of size variations, 45% in the range of 1-0.5 μm, 40% in the range of 500-300 nm, and 15% in the range of 200-100 nm. FIGS. 4J-4L represent the FESEM images of grinded jute carbon after ball milling for 15 hours at three magnifications of 2 μm, 1 μm, and 500 nm scale bar. A typical measurement of the particle size from the FESEM image indicated a wide range of size variations, 6%>500 nm, 50% in the range of 500-300 nm, 43% in the range of 200-100 nm. From FESEM data, it was clearly observed that the size of the carbon particles significantly decreased with the duration of ball milling. As the size of the developed carbon after 15 hour of ball milling is varying from 100-500 nm, it can be classified as submicron-/nano-jute carbon.

Figure 5:
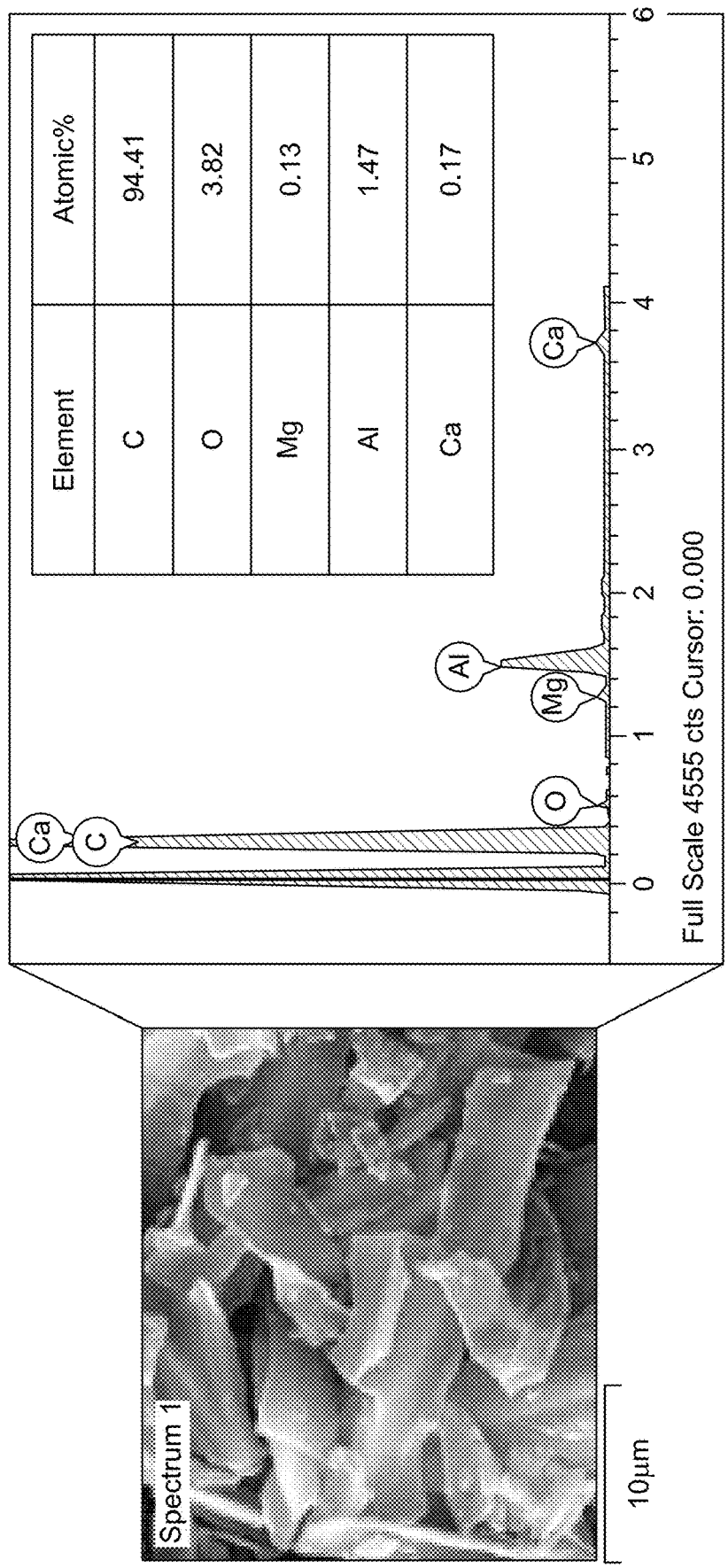
FIG. 5 illustrates an energy-dispersive X-ray spectroscopy (EDS) analysis of the grinded jute carbon, according to certain embodiments.

FIG. 5 shows the EDS spectrum and elemental composition of the grinded jute carbon. Carbon and oxygen are the major elements although traces of magnesium and calcium were also detected. The aluminum in the EDS was from the aluminum substrate used as a sample holder.

Transmission Electron Microscopic Analysis

Figure 6A:
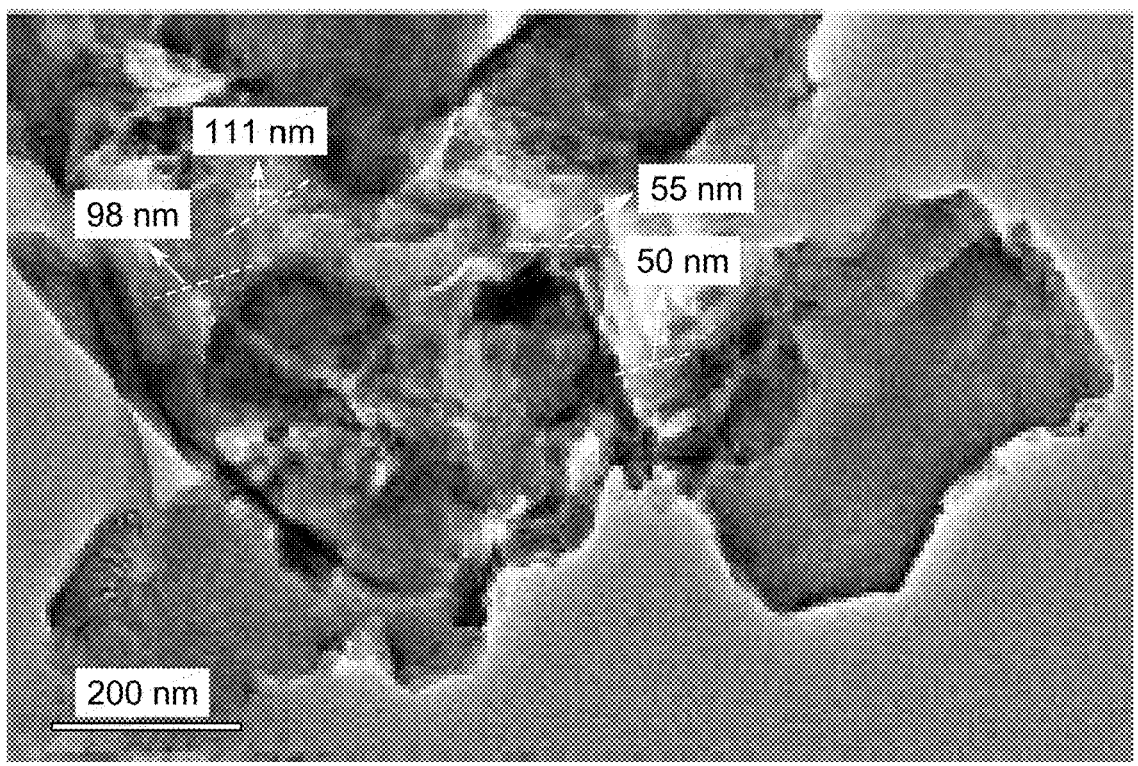
FIG. 6A illustrates a transmission electron microscopic (TEM) image of the submicron-/nano-jute carbon, according to certain embodiments.
Figure 6B:
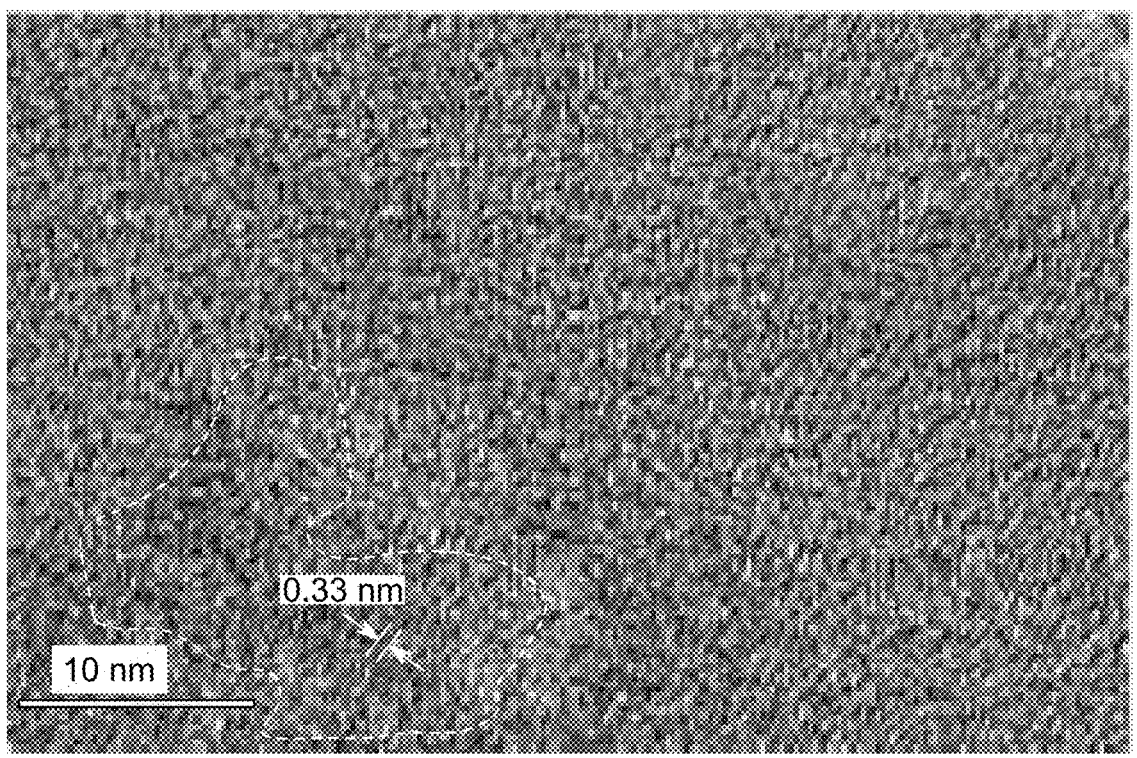
FIG. 6B illustrates a high-resolution transmission electron microscopic (HR-TEM) image of the submicron-/nano-jute carbon, according to certain embodiments.

The transmission electron microscopic (TEM) analysis was performed on the submicron-/nano-jute carbon to obtain information about the grain boundary distribution, lattice distortion of grains, and surface morphology of fine grains. FIG. 6A shows the TEM image representing the grain size and boundary distribution of the submicron-/nano-jute carbon. The individual grain boundaries of different particles can be clearly seen in FIG. 6A. The grain boundary distribution also confirms the presence of several particles of <100 nm, as indicated (dotted lines) at a few selected areas. The crystal lattice arrangement, lattice fringes, and d spacing of the submicron-/nano-jute carbon were observed using high-resolution transmission electron microscopy (HR-TEM), as shown in FIG. 6B. The HRTEM lattice distribution shows that the submicron-/nano-jute carbon was mostly amorphous in nature since few lattice fringes were observed, as indicated in the highlighted area. The width of the lattice fringe or the d spacing of the submicron-/nano-jute carbon was around 3.3 angstroms (Å) and matches the lattice spacing of the (002) crystal plane, which correlates with the XRD data.

Crystal Structure Analysis

Figure 7:
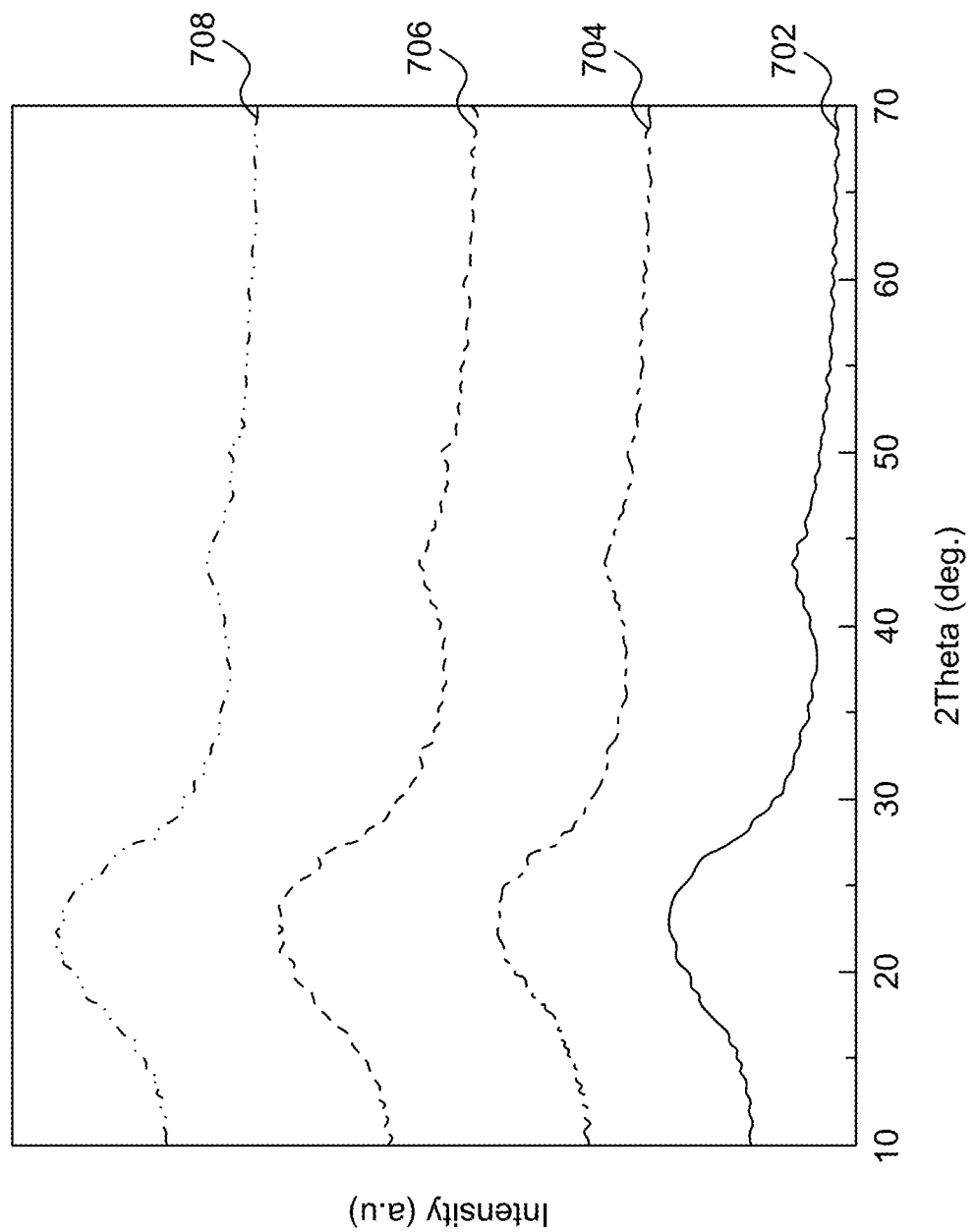
FIG. 7 illustrates an X-ray diffraction (XRD) pattern of the grinded jute carbon, and the carbon obtained after ball milling of the grinded jute carbon for 5 hours, 10 hours, and 15 hours, according to certain embodiments.

The XRD patterns of the grinded and ball-milled jute carbon are shown in FIG. 7. The XRD pattern of grinded jute carbon (702) shows diffraction peaks in the range of 19 to 27°, 44°, 50°, 59°2θ corresponding to (002), (101), (102), (103) planes of carbon (JSCPDS card No. 01-077-7164). However, the occurrence of peaks at ~26.5° 2θ, corresponds to (002) planes of graphite (JSCPDS card No. 00-056-0159). The XRD pattern of the carbon obtained after ball milling of the grinded jute carbon for 5 (704), 10 (706), and 15 hours (708), respectively. The peaks formed in the ball-milled jute carbon are similar to those noted in the grinded jute carbon. From the XRD patterns, shown in FIG. 7, it is also clear that the grinded jute carbon and the ball-milled jute carbon are amorphous in nature.

X-Ray Photoelectron Spectroscopy (XPS)

Figure 8A:
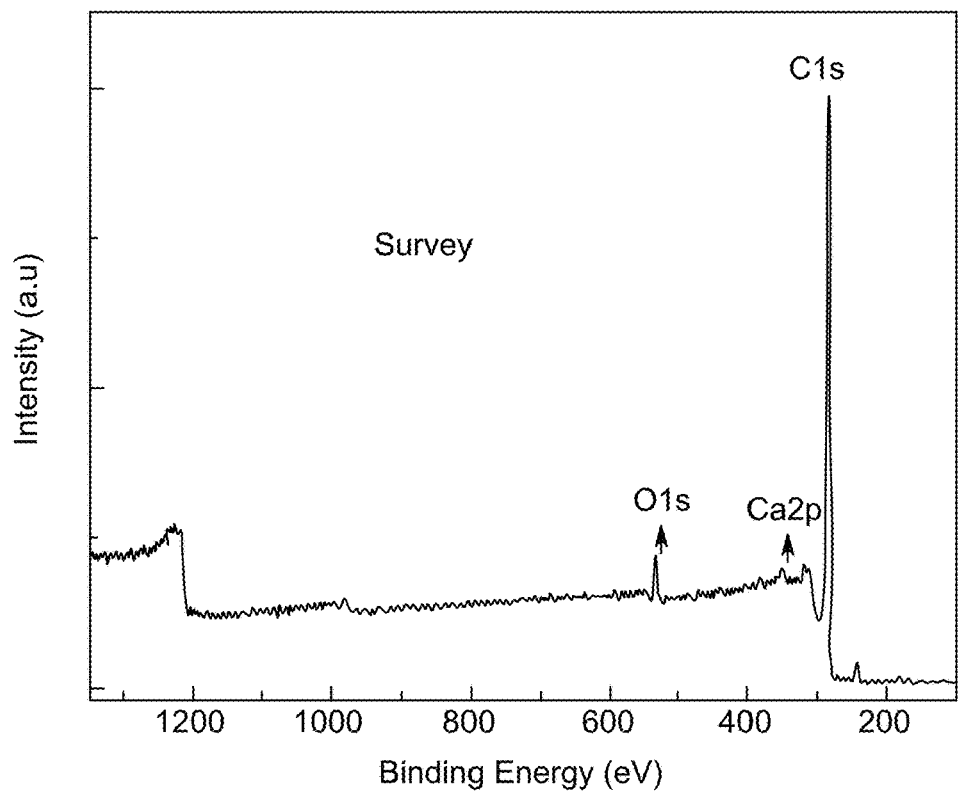
FIG. 8A illustrates an X-ray photoelectron spectroscopy (XPS) spectra of the submicron-/nano-jute, according to certain embodiments.
Figure 8B:
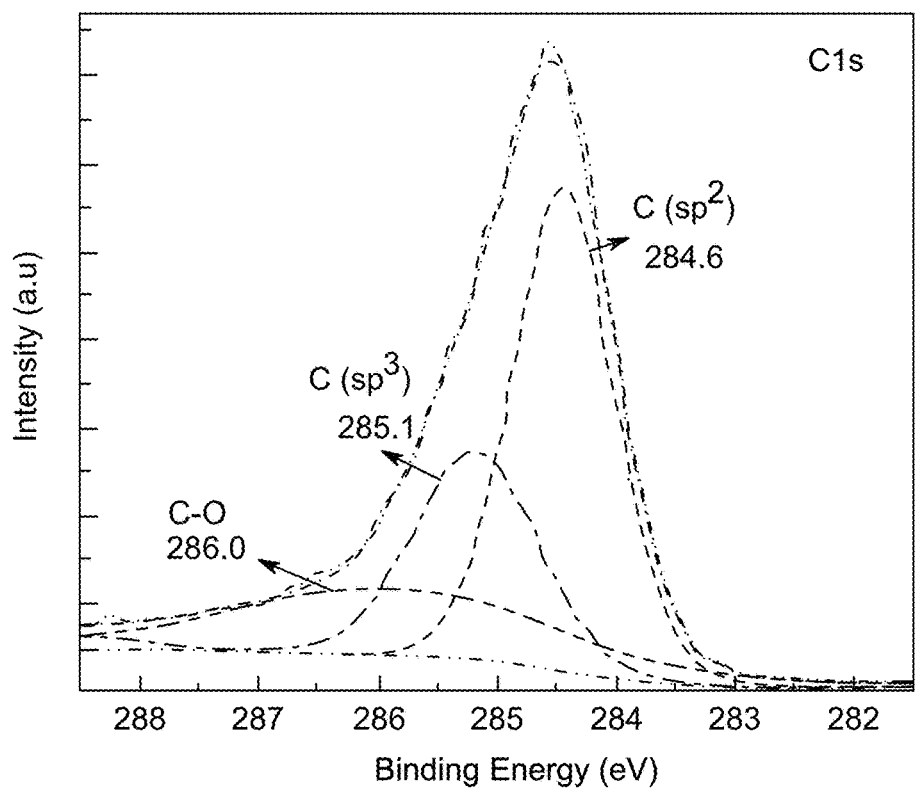
FIG. 8B illustrates C1s spectra of the submicron-/nano-jute, according to certain embodiments.
Figure 8C:
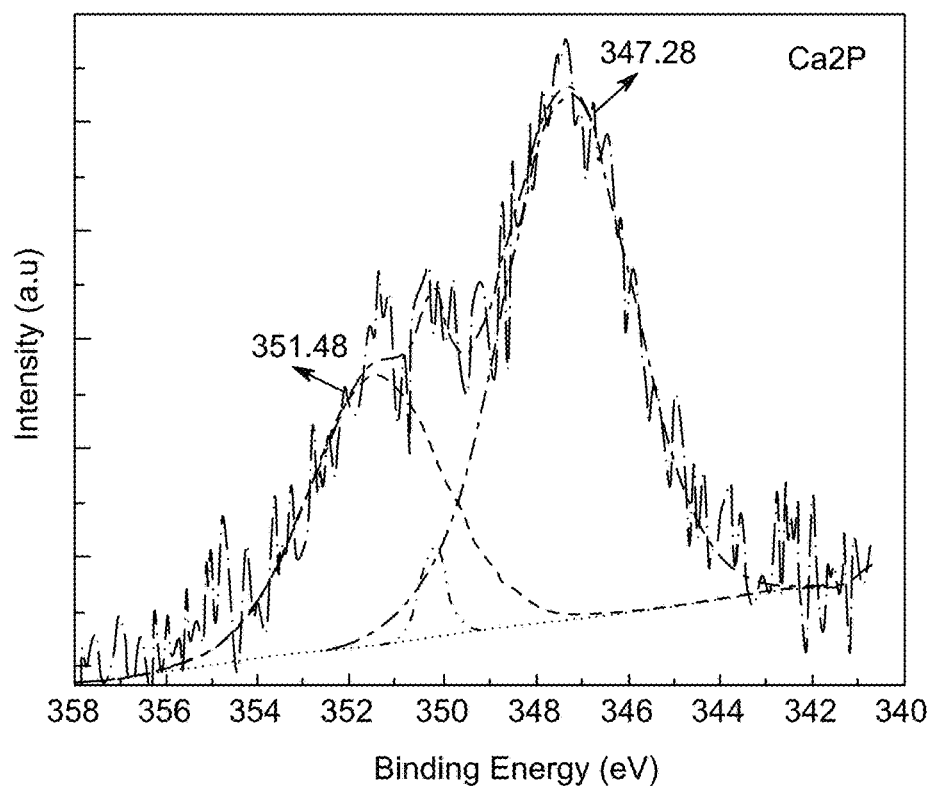
FIG. 8C illustrates Ca2p spectra of the submicron-/nano-jute carbon, according to certain embodiments.
Figure 8D:
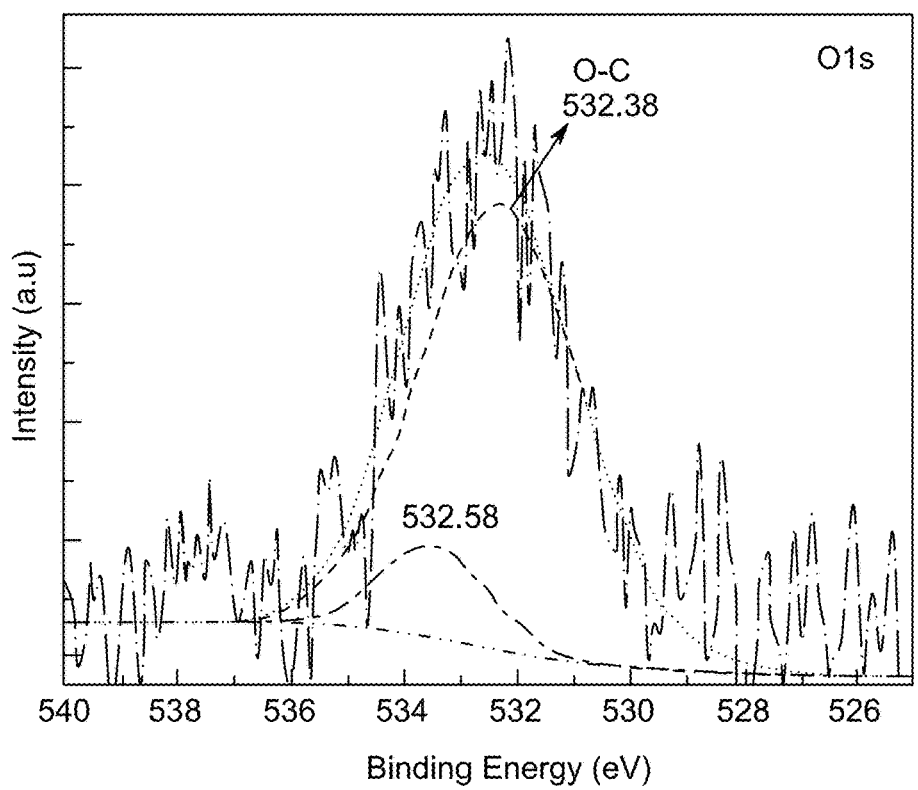
FIG. 8D illustrates O1s spectra of the submicron-/nano-jute carbon, according to certain embodiments.

The additional information on the chemical composition of the developed submicron-/nano-jute carbon was obtained by recording their XPS spectra. The XPS spectra, as shown in FIG. 8A, indicate the presence of carbon and oxygen as the major constituents in the developed submicron-/nano-jute carbon in addition to minor quantities of calcium. The strong peaks of C1s, Ca2p, and O1s are confirmed from the plots shown in FIGS. 8B-8D, respectively. FIG. 8B presents the deconvoluted XPS spectra of C1 s. The XPS spectra indicated the presence of $sp^2$ C (peak at 284.6 eV) and $sp^3$ C (peak at 285.1 eV) hybridized carbon as well as C—O (peak at 286 eV). Besides, the XPS peak (FIG. 8C) was at a binding energy of 347.28 eV corresponding to Ca 2p3/2, whereas the secondary XPS peak was at a binding energy of 351.48 eV corresponding to Ca 2p1/2. The peak at 532.18 eV in the O1s XPS spectra shown in FIG. 8D corresponds to O—C.

Raman Spectroscopy Analysis

Figure 9:
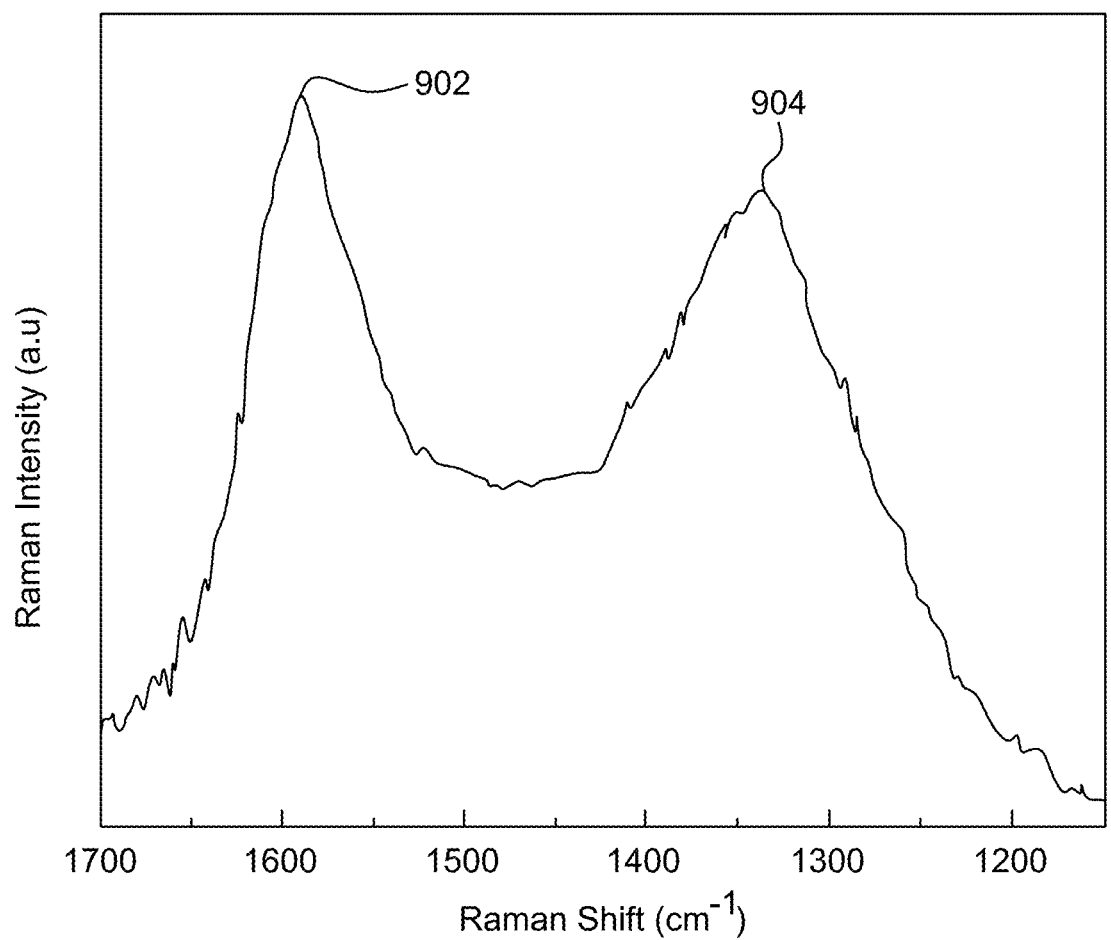
FIG. 9 illustrates a Raman spectrum of the developed submicron-/nano-jute carbon, according to certain embodiments.

FIG. 9 shows the Raman spectra of the submicron-/nano-jutecarbon obtained after 15 hours of ball milling of the grinded jute carbon. The peaks observed at 1591 $cm^{-1}$ and 1338 $cm^{-1}$ were the most intense. The peak at 1591 $cm^{-1}$ was the G-band 902 and the peak at 1338 $cm^{-1}$ was the D-band 904. The G-band peak 902 was due to the stretching of C—C in graphitic carbon in the $sp^2$ hybridized carbon structure. The occurrence of an additional band in the carbon structure, i.e., D-band 904, is induced by the disorder or defects. Further, the width of the peaks indicated that the carbon was amorphous in nature. However, the $I_G/I_D$ ($I_G$=intensity of the G-band 902, $I_D$=intensity of the D-band 904) ratio calculated from the above spectra of carbon was 1.36, which indicated that the carbon contains a good amount of sp 2 graphite calculated from the above spectra of carbon was 1.36, which indicated that the carbon contains a good amount of sp$^2$ graphitic carbon.

Corrosion Resistance

Open Circuit Potential (OCP)

Figure 10:
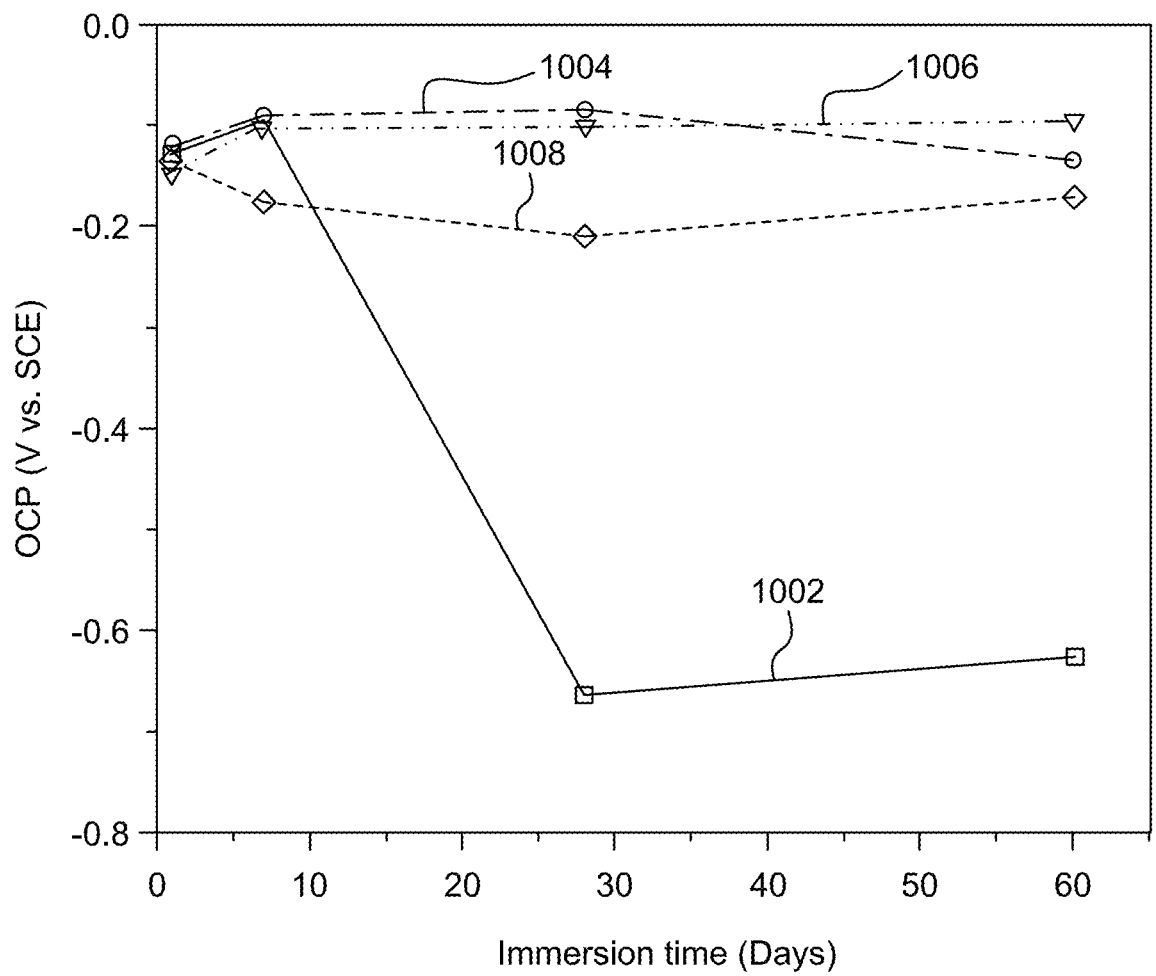
FIG. 10 illustrates an open circuit potential (OCP) on steel specimens coated with neat and composite coatings and exposed to 3.5% NaCl solution, according to certain embodiments.

The OCP was recorded for all the coating systems before running the EIS measurements. FIG. 10 presents the OCP values of neat (NE) 1002 and composite epoxy coatings containing 0.25, 0.75 and 1.0% of submicron-/nano-jute carbon (EC 0.25% 1004, EC 0.75% 1006 and EC 1.0% 1008) at different exposure periods while exposing the specimens to 3.5% NaCl solution. The OCP for the neat epoxy coating was less negative during initial immersion, although it decreased with time. However, the OCP for specimens with the composite coating was less negative and almost stable with time, confirming the beneficial effect of the composite coating in resisting corrosion. The more negative OCP values on the neat epoxy coating indicated the diffusion of chloride ions to the metal substrate. Further, the less negative and stable values of OCP on specimens with composite coating indicated that the developed submicron-/nano-jute-incorporated composite coating was effective in resisting the diffusion of chloride ions to the metal substrate. The discussion indicated that the corrosion performance of coating incorporating the developed submicron-/nano-jute-carbon was better than that of neat epoxy coating.

A more positive shift was reported in the OCP values in nanocomposite coatings containing functionalized multiwall carbon nanotubes compared to the neat epoxy. Among different compositions of the composite coating, one with 0.75% submicron-/nano-jutee carbon exhibited less negative and stable OCP values, indicating optimum for better performance among the coatings investigated.

Electrochemical Impedance Spectroscopy

Figures 11A, 11B:
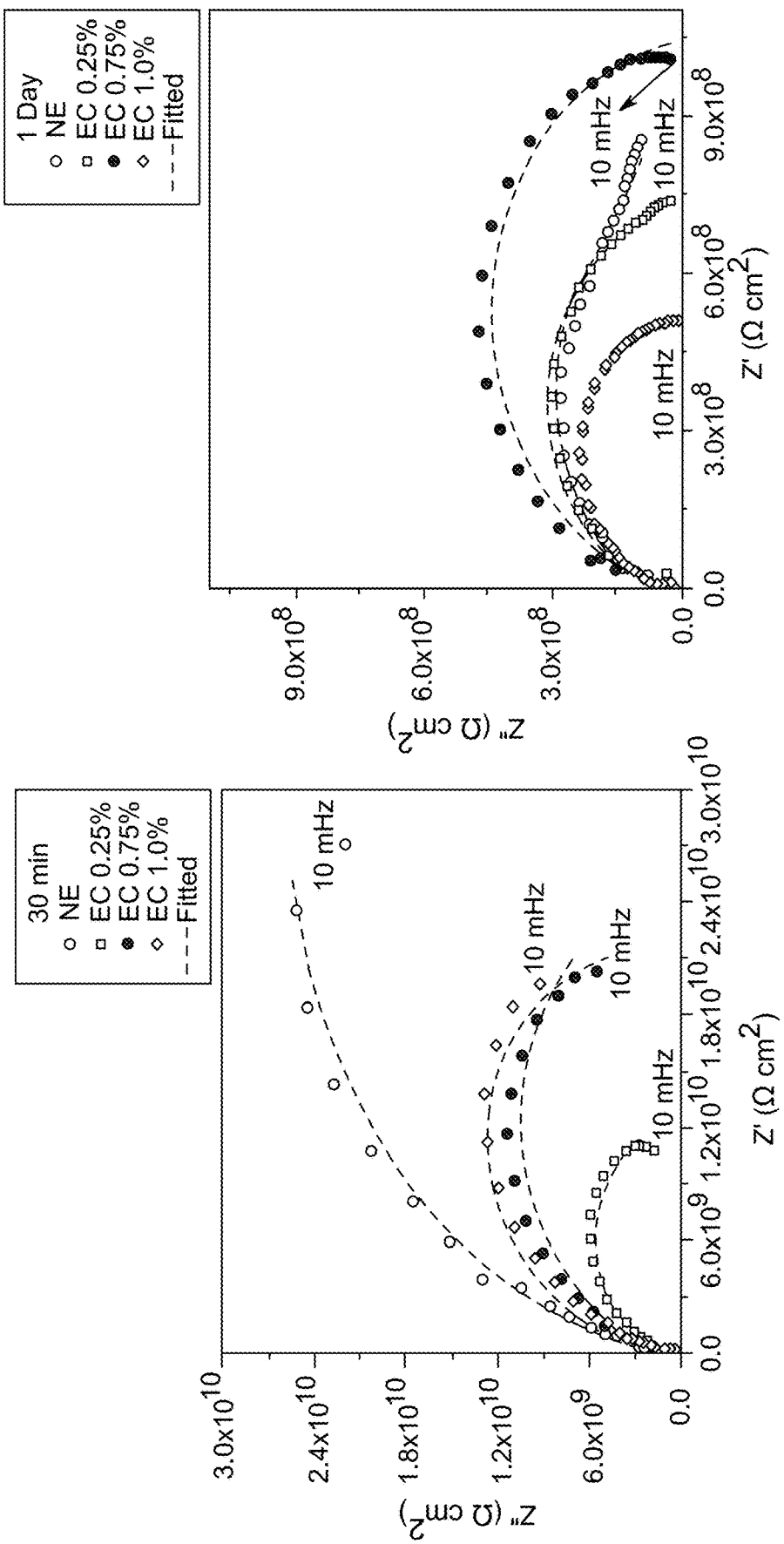
FIG. 11A illustrates a Nyquist plot for specimens coated with neat epoxy and composite epoxy coatings exposed to 3.5% NaCl solution for a period of 30 mins, according to certain embodiments.
FIG. 11B illustrates a Nyquist plot for specimens coated with neat epoxy and composite epoxy coatings exposed to 3.5% NaCl solution for a period of 1 day, according to certain embodiments.
Figures 11C, 11D:
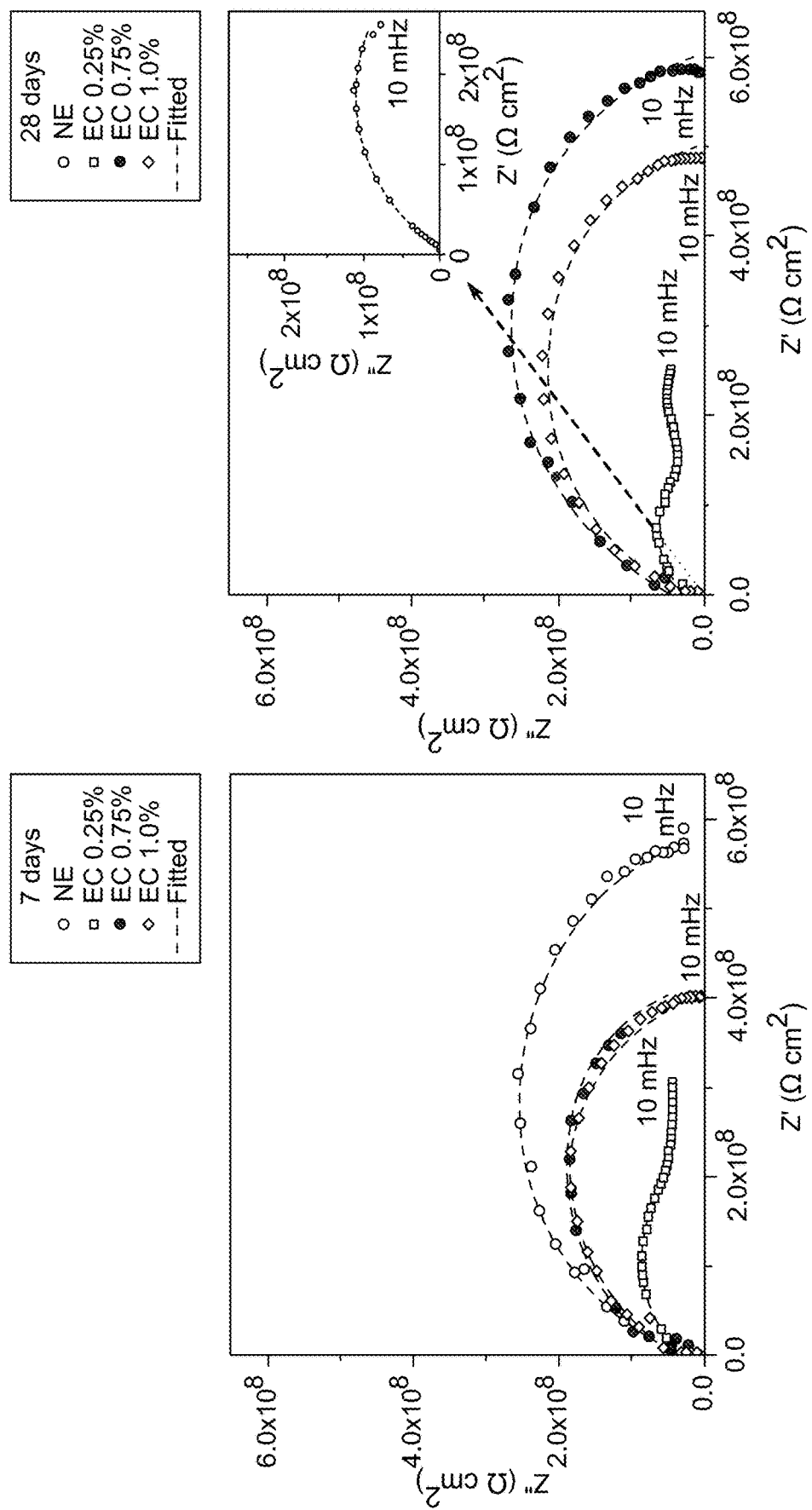
FIG. 11C illustrates a Nyquist plots for specimens coated with neat epoxy and composite epoxy coatings exposed to 3.5% NaCl solution for a period of 7 days, according to certain embodiments.
FIG. 11D illustrates a Nyquist plot for specimens coated with neat epoxy and composite epoxy coatings exposed to 3.5% NaCl solution for a period of 28 days, according to certain embodiments.
Figure 11E:
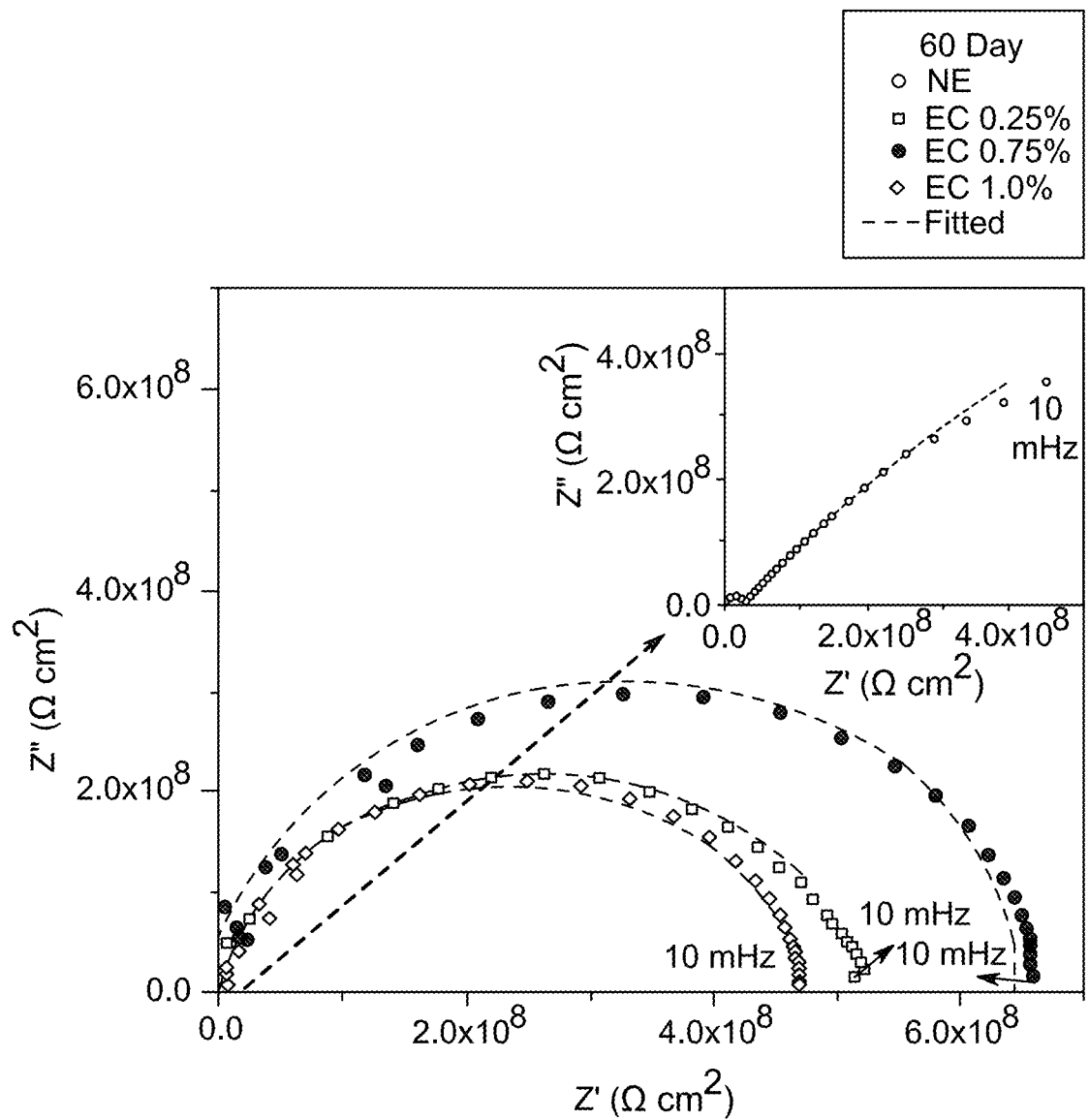
FIG. 11E illustrates a Nyquist plot for specimens coated with neat epoxy and composite epoxy coatings exposed to 3.5% NaCl solution for a period of 60 days, according to certain embodiments.
Figure 12A:
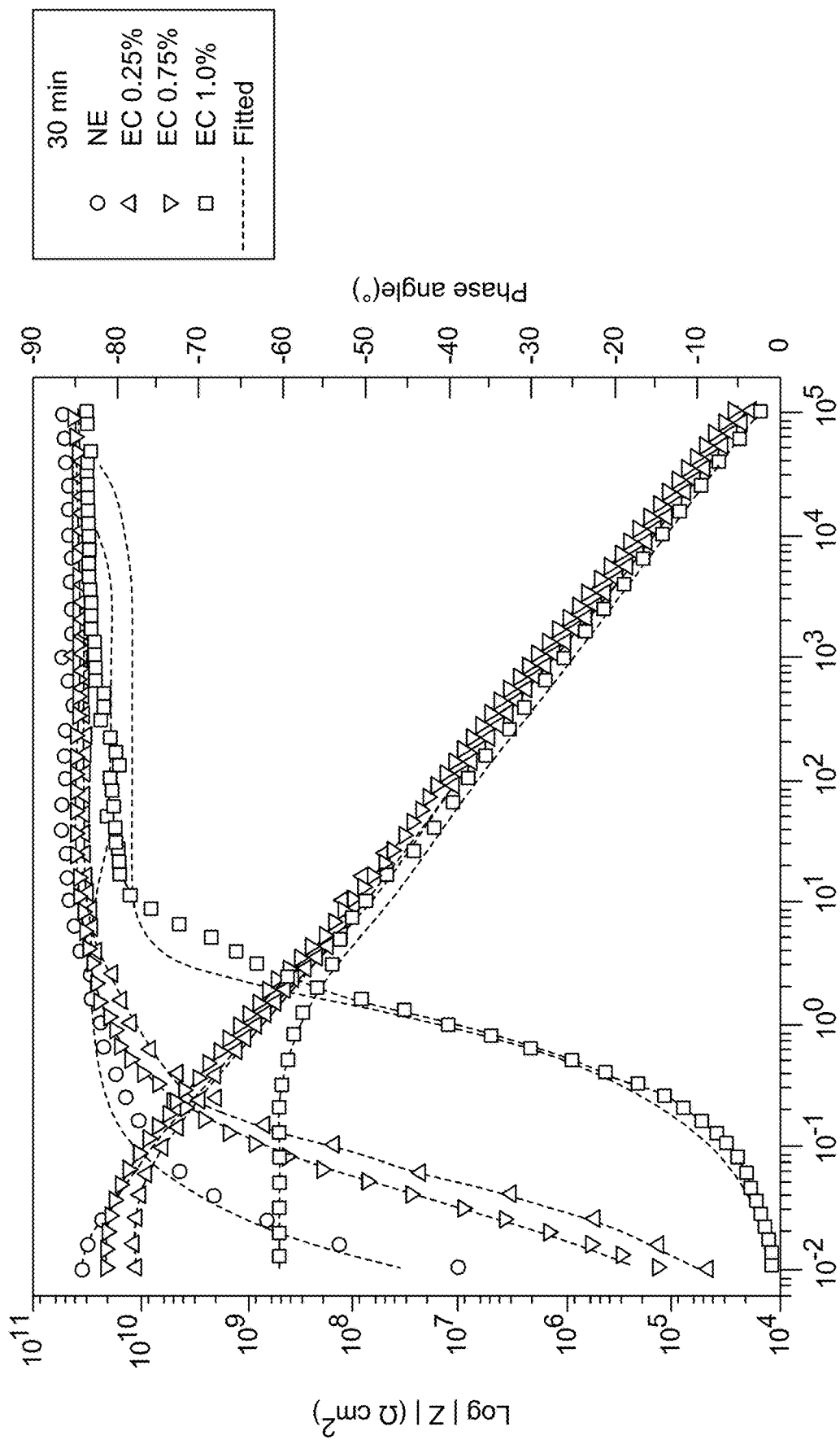
FIG. 12A illustrates Bode plots for specimens coated with neat epoxy and composite epoxy coatings exposed to 3.5% NaCl solution for a period of 30 mins, according to certain embodiments.
Figure 12B:
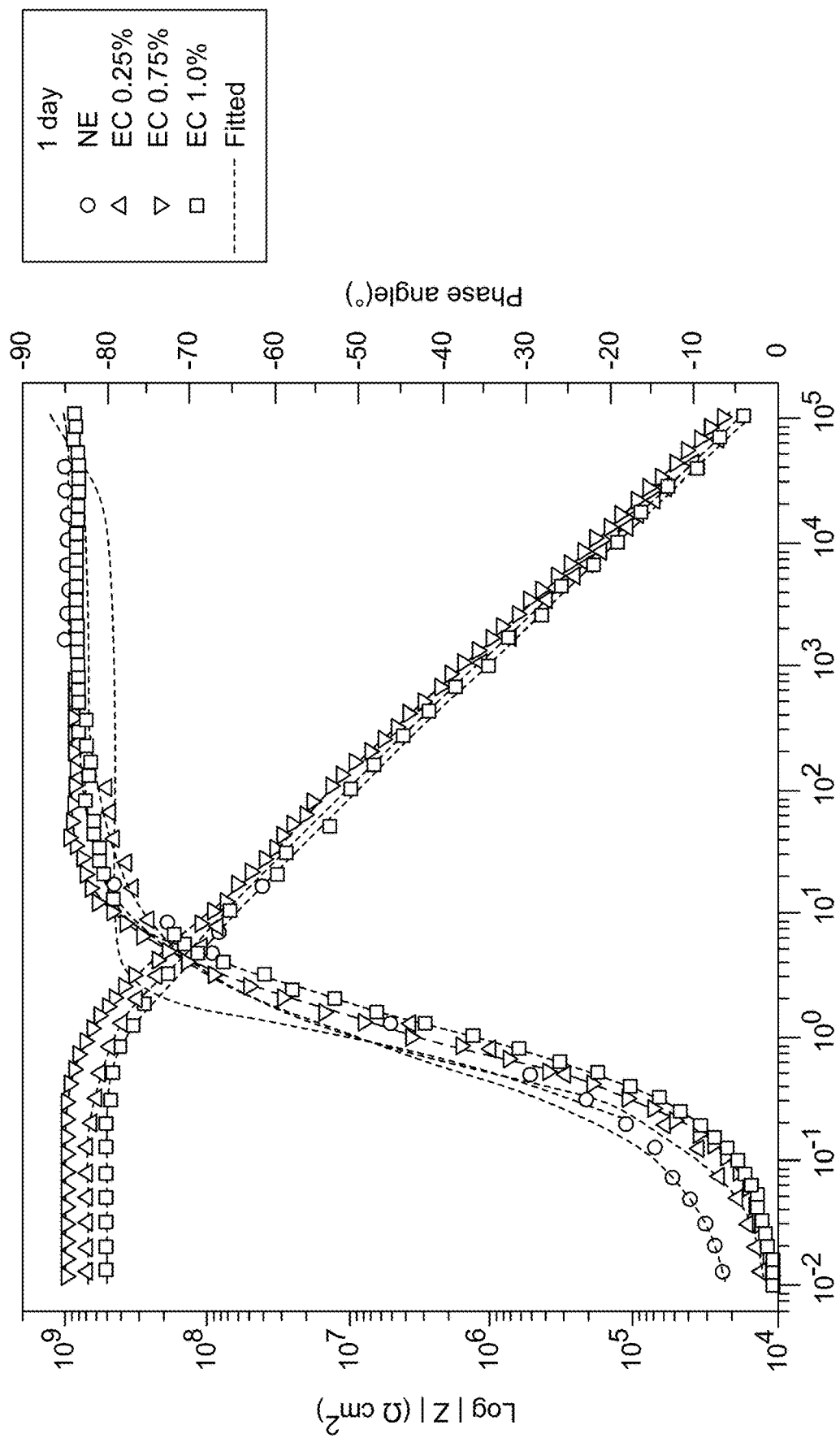
FIG. 12B illustrates Bode plots for specimens coated with neat epoxy and composite epoxy coatings exposed to 3.5% NaCl solution for a period of 1 day, according to certain embodiments.
Figure 12C:
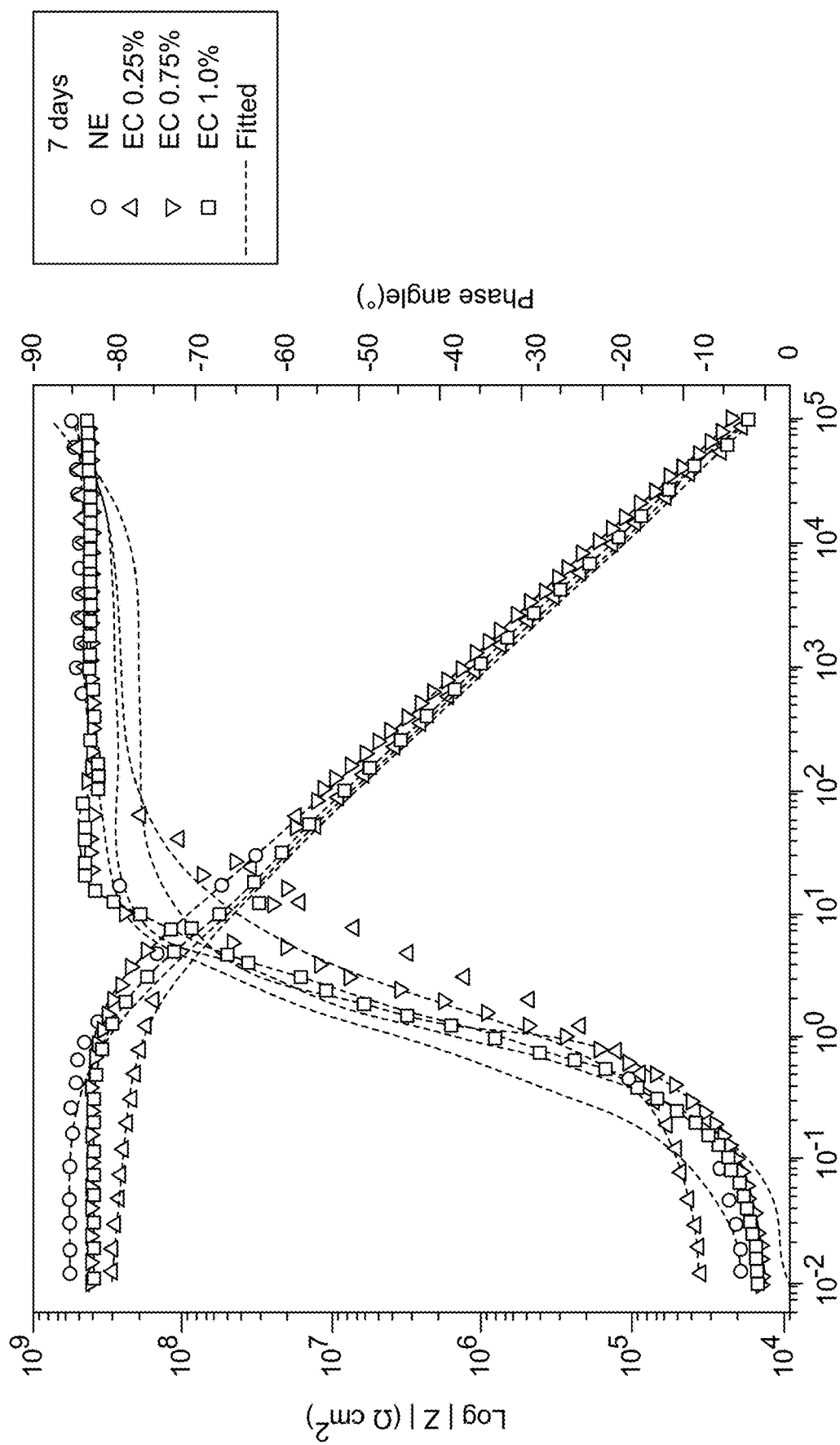
FIG. 12C illustrates Bode plots for specimens coated with neat epoxy and composite epoxy coatings exposed to 3.5% NaCl solution for a period of 7 days, according to certain embodiments.
Figure 12D:
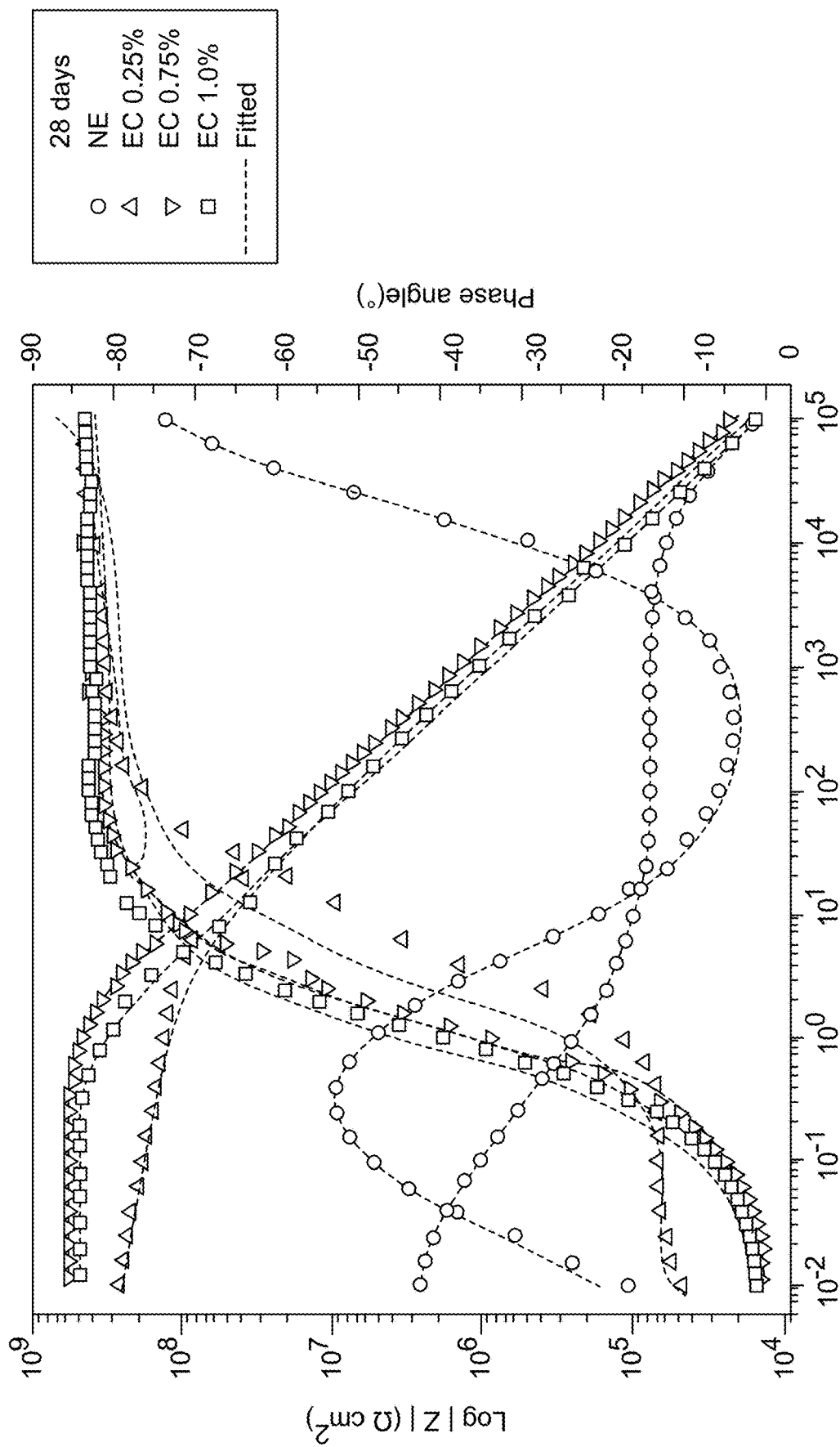
FIG. 12D illustrates Bode plot for specimens coated with neat epoxy and composite epoxy coatings exposed to 3.5% NaCl solution for a period of 28 days, according to certain embodiments.

The mechanistic and kinetic information on corrosion of steel coated with neat and composite coating was assessed using EIS. The alternating current (AC) impedance response of the steel specimens coated with neat and composite coating was measured for 30 minutes (FIG. 11A) and 1 day (FIG. 11B), 7 days (FIG. 11C), 28 days (FIG. 11D), and 60 (FIG. 11E) days of exposure to 3.5% NaCl solution. The Nyquist plots for the steel specimens coated with neat epoxy coating and composite coatings containing 0.25, 0.75, and 1.0% of submicron-/nano-jute carbon (EC 0.25%, EC 0.75%, and EC 1.0%) at different exposure periods are shown in FIGS. 11A-11E and the corresponding Bode plots representing the log of impedance modulus (|Z|) and phase angle versus the log of frequency (Hz) for the neat and composite epoxy coatings are shown in FIGS. 12A-12E. At the initial immersion time, the neat epoxy exhibited a larger diameter distorted semicircular capacitive arc compared to the composite coatings in the Nyquist plot (FIG. 11A) and a linear capacitive behavior with high impedance values in the Bode plot (FIG. 12A), indicating its better performance in resisting any ionic transfer within the coating system. The impedance modulus (|Z|) at 0.01 Hz for neat epoxy was in the range of 1010 Ωcm$^2$, whereas for the composite coatings, it was around 108-1010 Ωcm$^2$ following an order of neat epoxy>EC 0.75%>EC 0.25%>EC 1.0%. The impedance values were of the order of 109-1010 Ωcm$^2$ in epoxy coating with the carbon nanotubes (<1 wt. %) and zinc (60%). However, after 1 day to 7 days of exposure to the chloride solution, the diameter of the semicircular capacitive arc drastically decreased and the impedance of the coating at low frequencies significantly dropped in the Bode plot as shown in FIGS. 11B-11C and FIGS. 12B-12C. The drop in the impedance is attributed to the diffusion of ionic species, here chlorides, into the neat epoxy coating matrix. Further, with extended exposure (after 28 days) the impedance spectrum changed into two-time constants, as shown in FIG. 11D and FIG. 12D, indicating the diffusion of chloride ions through the coating to the metal surface and the occurrence of corrosion reactions at the metal-coating interface. The observation was indicative of the long-run vulnerability of the neat epoxy coating in resisting the diffusion of electrolyte to the metal substrate.

Figure 12E:
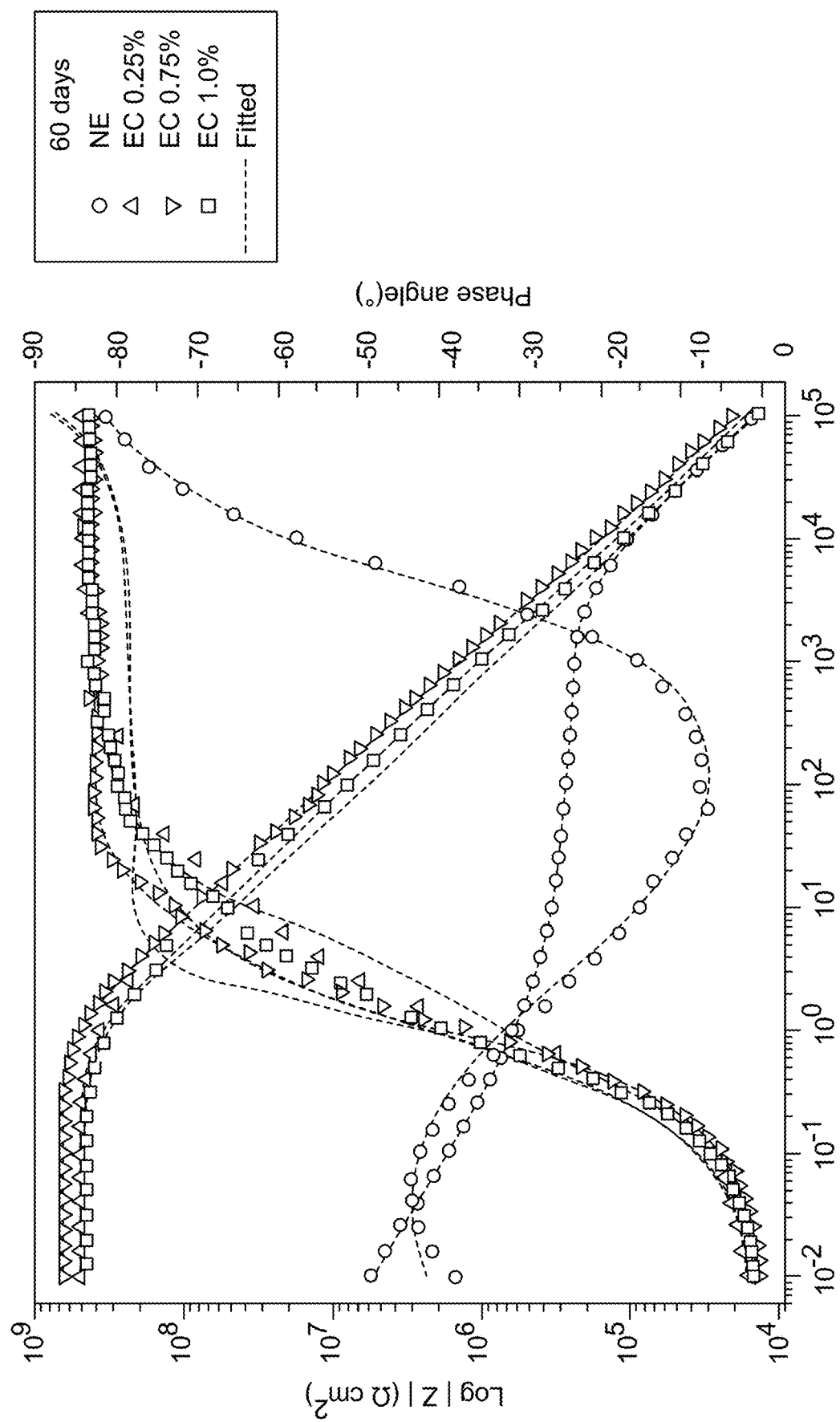
FIG. 12E illustrates Bode plots for specimens coated with neat epoxy and composite coatings exposed to 3.5% NaCl solution for a period of 60 days exposure, according to certain embodiments.

The diameter of the distorted capacitive arcs for the specimens coated with the composite coating also decreased largely from 30 min to one day of exposure to the chloride solution. However, not much variation was noted in the capacitive curve with increased exposure to the electrolyte. Also, the impedance modulus decreased significantly from the initial 30 min to 1 day of exposure. However, there was no significant change with further exposure and the impedance was around 108 Ωcm$^2$ throughout the test duration of 60 days, as shown in FIG. 11E and FIG. 12E. Moisture uptake by the coating could be the reason for the decrease in the impedance during the initial immersion time; however, the barrier properties of the nano carbon resisted the diffusion of the electrolyte at later point of time. The result indicated the excellent barrier performance of the jute carbon nanoparticles in the composite coatings in minimizing corrosion of the metal substrate. However, among the different concentrations of carbon in composite coatings, the corrosion resistance of coating with 0.75% carbon was the highest.

Figure 13A:
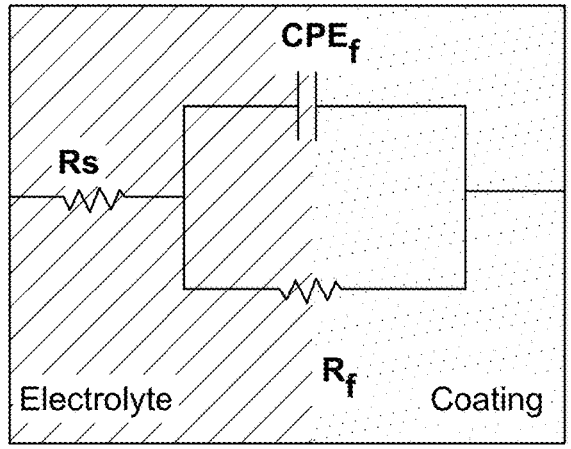
FIG. 13A illustrates an equivalent circuit for electrochemical impedance spectroscopy (EIS) data during initial immersion period, according to certain embodiments.
Figure 13B:
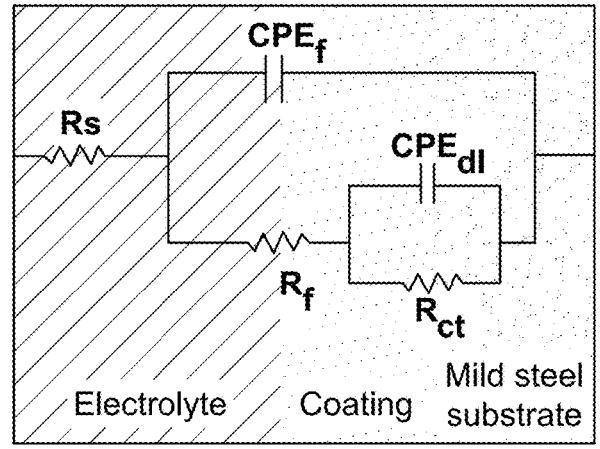
FIG. 13B illustrates an equivalent circuit for EIS data related to the penetration of electrolyte into coating, according to certain embodiments.
Figure 13C:
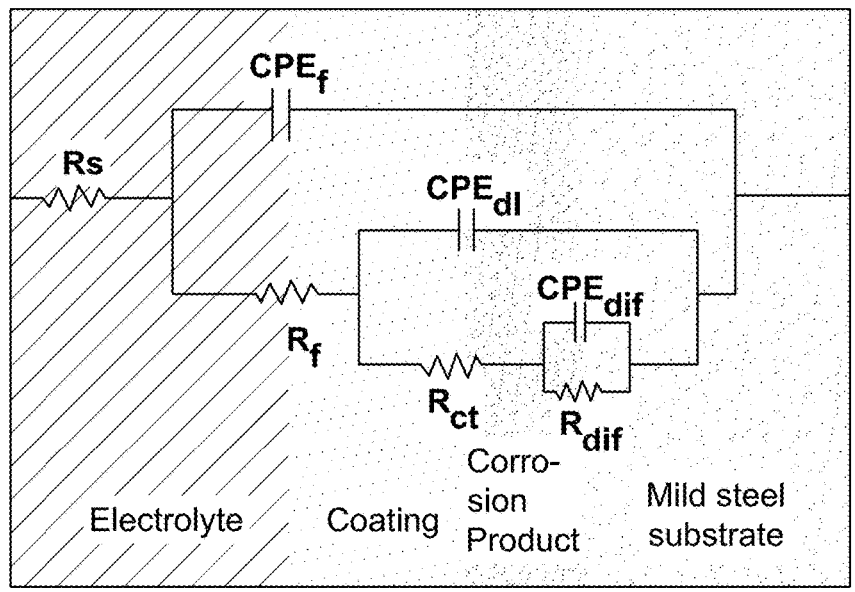
FIG. 13C illustrates an equivalent circuit for EIS data related to the formation of corrosion products, according to certain embodiments.

FIGS. 13A-13C depict the equivalent circuits used for fitting the EIS impedance data of neat and composite epoxy coatings to obtain information on the electrochemical parameters. The impedance data for the initial immersion period of 30 min was fitted using the equivalent circuit depicted in FIG. 13A, where $R_s$ stands for resistance offered by the electrolyte, $R_f$ is the resistance of coating film to the passage of electrolyte, and $CPE_f$ is the constant phase element for coating capacitance. The impedance data for more than 30 minutes (1 day or more) of exposure were fitted using the electrical circuit shown in FIG. 13B; where, as stated earlier, $R_{ct}$ represents the charge transfer resistance across the metal surface and $CPE_{dl}$ represents the constant phase element for the double layer capacitance between the coating/metal interface and the electrolytic solution. However, for long periods of immersion (more than 28 days), the impedance spectra of neat epoxy coating exhibited two-time constants attributable to the accumulation of the corrosion products at the coating/metal interface and, as such, the equivalent circuit shown in FIG. 13B can no longer be used. Thus, to accommodate the impedance due to the corrosion product, an equivalent circuit shown in FIG. 13C was opted, where $CPE_{diff}$ and $R_{diff}$ represent the diffusion capacitive and resistant components, respectively. Moreover, the constant phase elements (CPEs) in the electrical circuits compensates the deviations from a non-homogenous surface of the coating to that of a perfect capacitance.

Figure 14A:
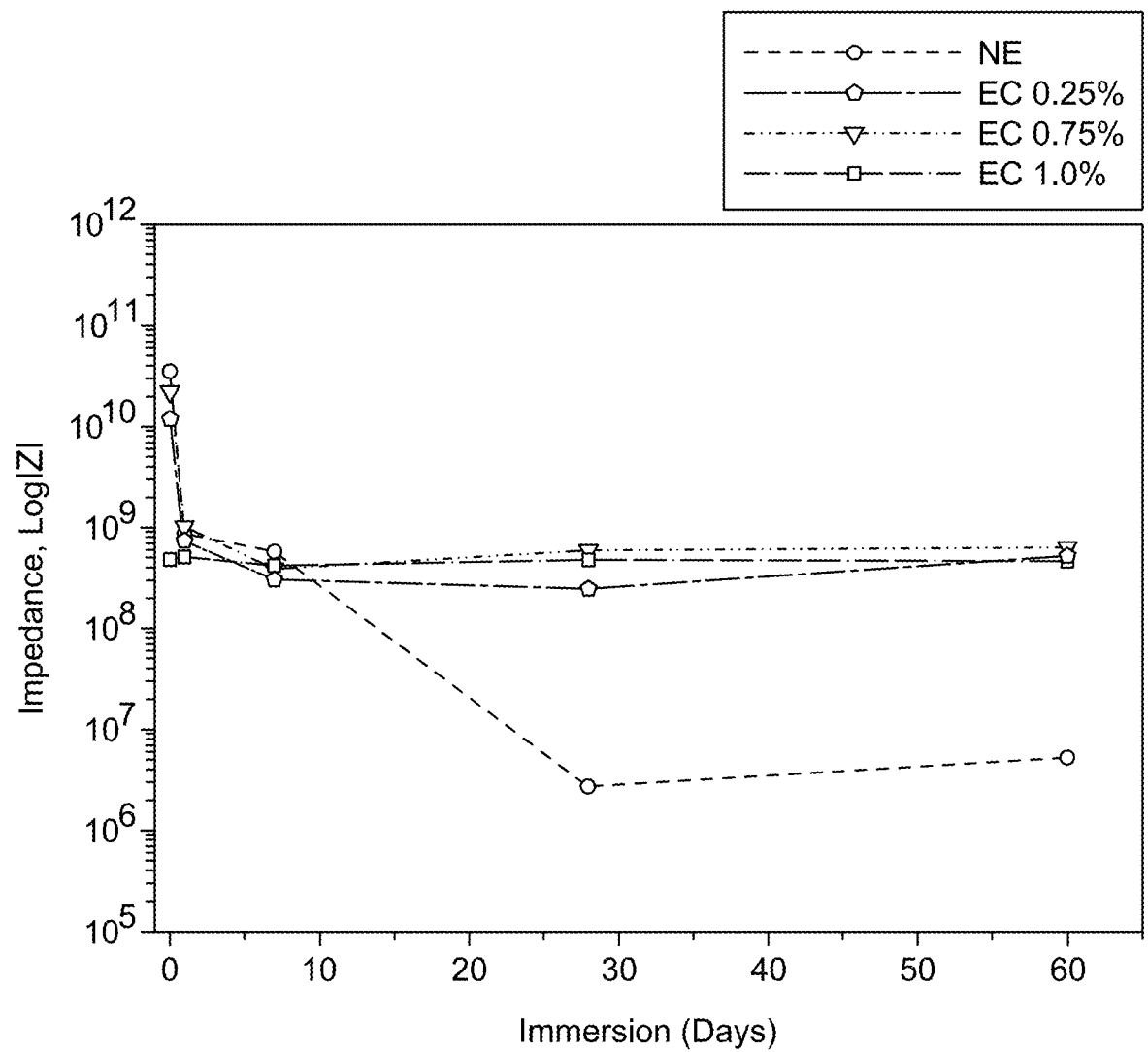
FIG. 14A illustrates an impedance versus immersion time plot for specimens coated with composite and neat epoxy coating and exposed to 3.5% NaCl solution, according to certain embodiments.

The overall corrosion resistance performance of the coatings was further evaluated by interpreting the variation of impedance modulus at a low frequency as a function of time (obtained from the Bode plots). The variation in the coating film resistance ($R_f$) and charge transfer resistance ($R_{ct}$) at the metal surface was obtained from the equivalent electrical circuits, shown in FIGS. 13A-13C. The values of impedance modulus (||Z||), $R_f$ and $R_{ct}$ versus time for the specimens coated with neat and composite coatings are plotted in FIGS. 14A-14C. The impedance data shown in FIG. 14A indicate that the composite coatings exhibited a similar behavior all over the test duration without any drop in the impedance values at higher immersion times. The observation indicated that the composite coating was less permeable even after a longer exposure and resisted the initiation of corrosion. On the contrary, the impedance of the specimens coated with neat epoxy coating dominated during the initial immersion time, i.e., until 7 days, and beyond this, the impedance dropped drastically with time leading to the corrosion initiation within 28 days of exposure. After 28 days, the impedance was 2.42×108 Ωcm², 6×108 Ωcm², 4.75×108 Ωcm² in EC 0.25%, EC 0.75%, and EC 1.0%, respectively, which were two orders of magnitude more than the impedance for specimens coated with the neat epoxy coating (2.68×106 Ωcm²). The impedance of the composite coatings obtained in the present study (at 60 days) was close to the values reported (108 Ωcm²) using 5 wt. % graphitic carbon nitride/ZnO nanocomposite coatings in 3.5% NaCl exposure for 60 days. Further, the present study impedance values were higher than the values reported (106 Ωcm²) incorporating 0.7 wt. % graphene oxide (GO)/zeolite molecular sieves (ZSM-5) as the best composition for anti-corrosion performance exposed to 3.5% NaCl for about 700 hours (29 days).

Figure 14C:
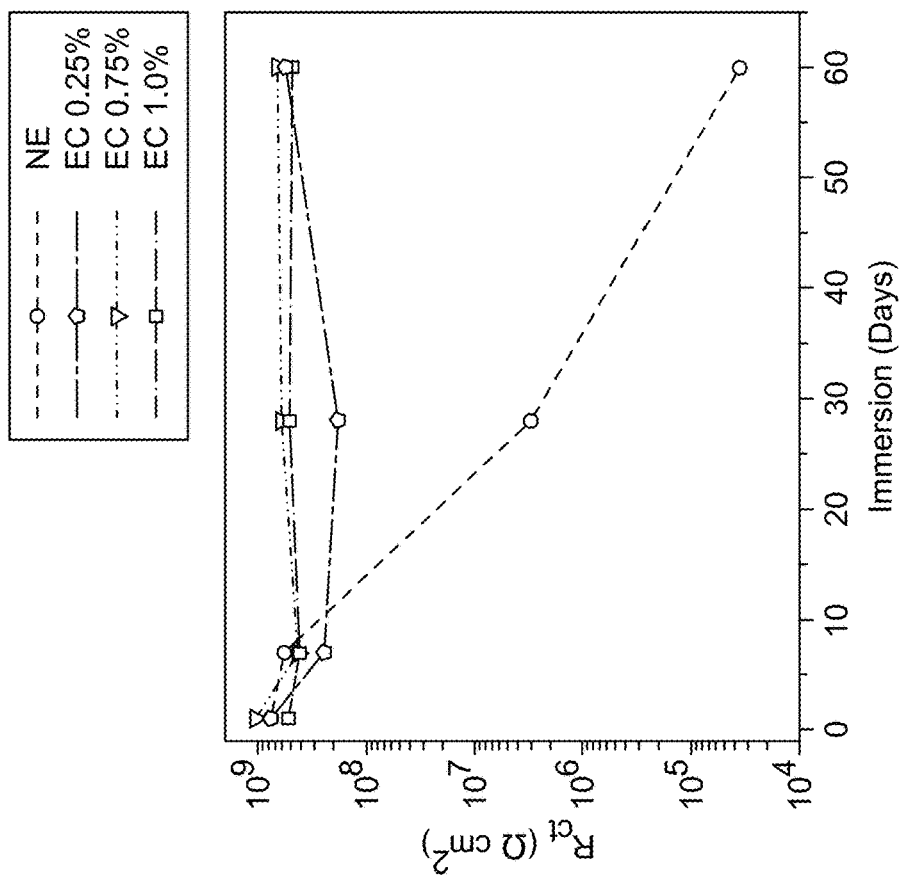
FIG. 14C illustrates charge transfer resistance $R_{ct}$ curves for specimens coated with composite and neat epoxy coating and exposed to 3.5% NaCl solution, according to certain embodiments.
Figure 14B:
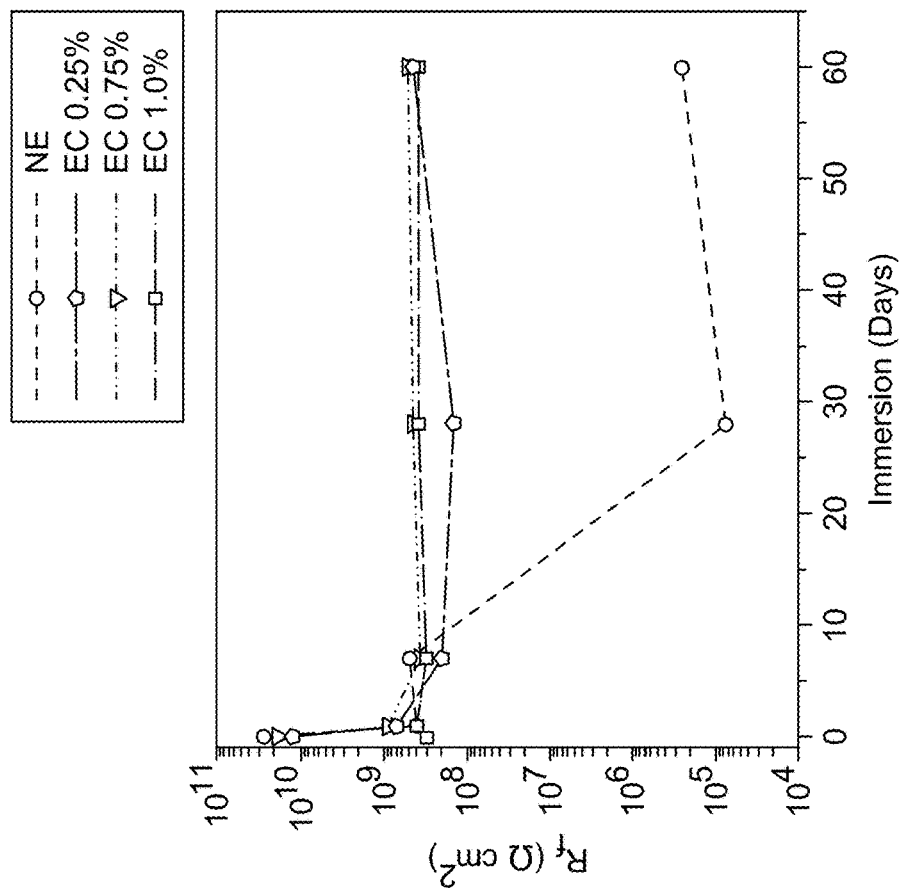
FIG. 14B illustrates film resistance ($R_f$) curves for specimens coated with composite and neat epoxy coating and exposed to 3.5% NaCl solution, according to certain embodiments.

Another important indicator of the surface protection performance of a coating is $R_f$. FIG. 14B depicts the $R_f$ of the neat and composite epoxy coatings during all exposure durations. It could be observed from the $R_f$ data that the neat epoxy coating exhibited a higher resistance until 7 days, whereas with higher immersion time, the resistance of the coating started to decrease compared to the composite coatings. After 28 days of exposure, the coating resistance of the composite coatings was around 108 Ωcm², which was nearly four orders of magnitude more than that of the neat epoxy coating (104 Ωcm²). The $R_f$ values obtained in the present study were much higher than the values reported in the range of 104 Ωcm² in functionalized multiwall carbon nanotubes/polyindole nanocomposite coating exposed to 3.5% NaCl solution for 20 days at 0.25 wt. % as the best corrosion performance. Further, $R_{ct}$ values for the composite coatings were more than that of the neat epoxy coating, as shown in FIG. 14C. The higher $R_{ct}$ values of the composite coatings revealed its ability to alleviate the corrosion process at the metal-coating interface. However, the performance of EC 0.75% composite coating was relatively better than that of other combinations, indicating the 0.75% carbon content as the optimum dosage. Thus, collectively, all impedance spectrum data indicated the protective performance of the composite coatings in the long run compared to the neat epoxy coating. The incorporation of uniformly distributed submicron-/nano-jute carbon in epoxy acted as a barrier by filling the micropores of the coating and resisted the penetration of corrosive species to the metal substrate.

Potentiodynamic Polarization

Figure 15A:
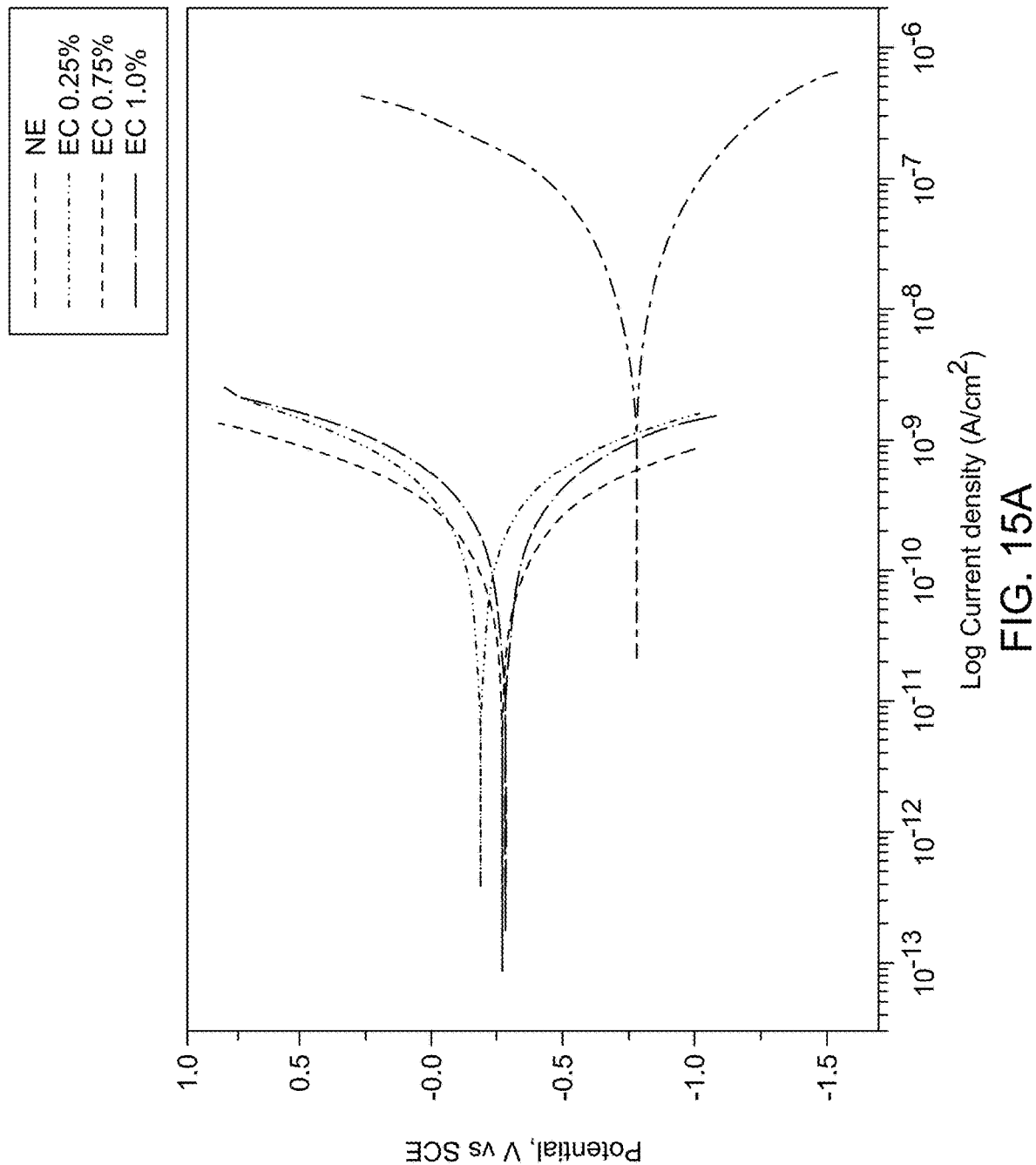
FIG. 15A illustrates potentiodynamic polarization curves for specimens coated with neat and composite epoxy coatings and exposed to 3.5% NaCl solution, according to certain embodiments.
Figure 15B:
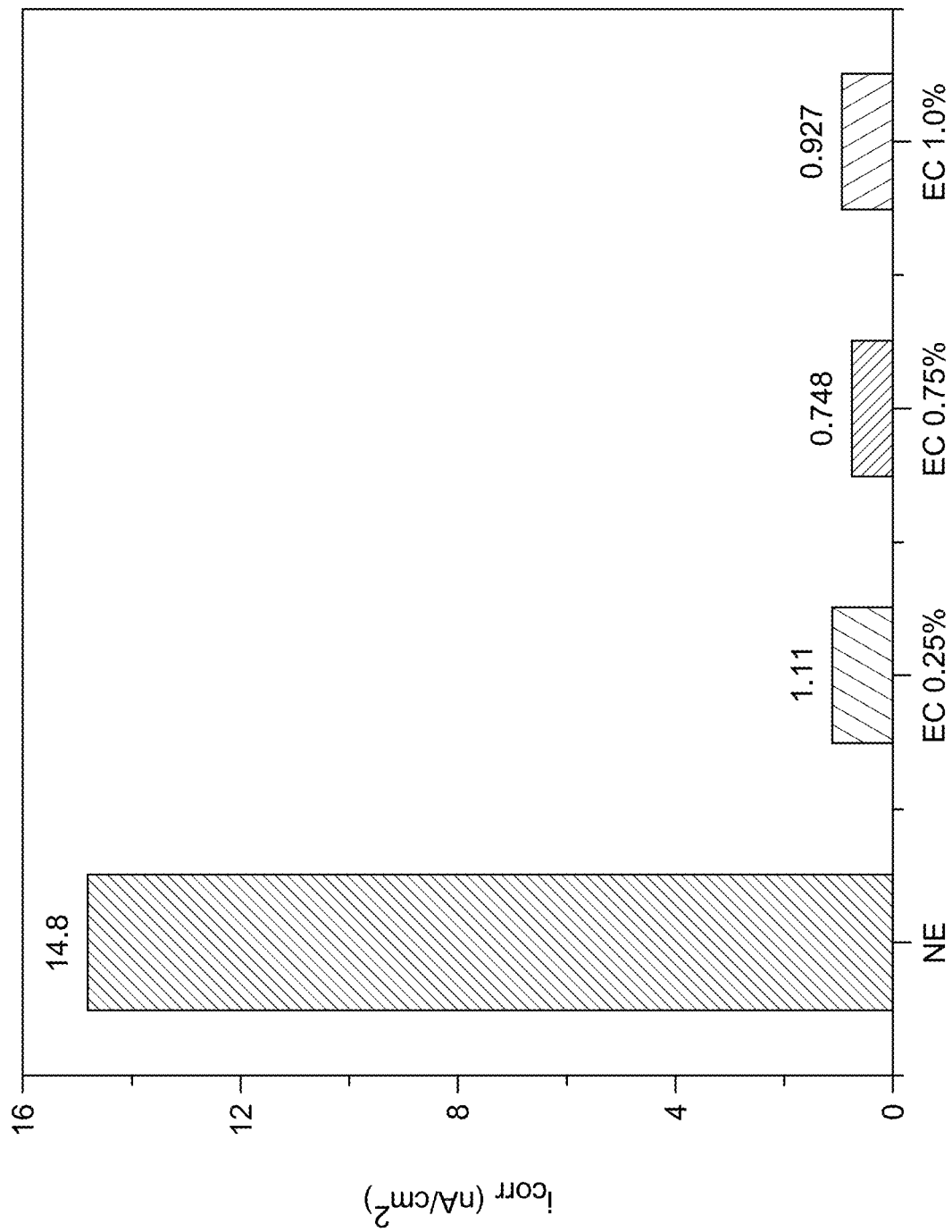
FIG. 15B illustrates corrosion current density on specimens coated with neat and composite epoxy coatings and exposed to 3.5% NaCl solution, according to certain embodiments.

The mechanistic and kinetic information on corrosion of specimens coated with neat and composite coatings were analyzed using the potentiodynamic polarization technique. The anodic and cathodic polarization curves of specimens coated with neat and composite coatings exposed to 3.5% NaCl solution for 60 days are shown in FIG. 15A. Uniform corrosion was noted in all the coated specimens. The corrosion potential was −0.776 V (versus SCE) for the specimen coated with neat epoxy, whereas it was in the range of −0.278 to −188 V (versus SCE) in the specimens coated with the composite coating incorporating submicron/nano jute carbon, indicating improved corrosion resistance of the latter coating. It was also evident from the curves that both the anodic and cathodic current densities of composite coating decreased compared to the neat epoxy coating, indicating restraining of the anodic and cathodic reactions at the metal surface active sites. The electrochemical parameters, such as a corrosion current density ($i_{corr}$), corrosion potential ($E_{corr}$), anodic Tafel slope ($\beta_a$), and cathodic Tafel slope ($\beta_c$) obtained PDP plots, are summarized in Table 1. The $i_{corr}$ on specimens coated with neat and composite epoxy coatings is depicted in FIG. 15B. The $i_{corr}$ on specimens coated with composite coating was less than that on the specimens coated with the neat epoxy coating. The icon on specimens coated with EC 0.25%, EC 0.75%, and EC 1.0% decreased by 92.5%, 95%, and 93.7%, respectively, compared to the neat epoxy coating. The results indicated that the incorporation of submicron-/nano-jute carbon significantly improved the corrosion resisting performance of the neat epoxy coating.

TABLE 1

Electrochemical parameters for the specimens coated with neat and composite coating exposed to 3.5% NaCl solution

| Coating | $E_{corr}$ [mV vs SCE] | $\beta a$ V/decade | $\beta c$ V/decade | $i_{corr}$ [µA/cm²] | Corrosion rate [mpy] |
|---|---|---|---|---|---|
| Neat epoxy | −776.0 | 0.422 | 0.284 | 0.0148 | 2.631E−03 |
| EC 0.25% | −188.0 | 2.534 | 2.704 | 0.00111 | 0.197E−03 |
| EC 0.75% | −271.0 | 3.031 | 2.946 | 0.00075 | 0.132E−03 |
| EC 1.0% | −278.0 | 2.237 | 2.062 | 0.00093 | 0.164E−03 |

Salt Spray Evaluation

The corrosion resistance performance of the specimens coated with neat and composite coatings were examined through salt spray exposure. A vertical uniform V-cut was made in the center of each coated specimen as per ASTM D1654 prior to placing them in the salt spray chamber. The width of the scribe on each specimen was measured using a crack-measuring microscope at six representative locations. The specimens were then exposed to 5% NaCl spray for 1000 hours. After the exposure, the specimens were removed, cleaned, and photographed. The width of the scribe after exposure was measured again at six representative locations representing maximum and minimum corrosion and discoloration. The rust creepage of the coated specimens after salt spray exposure was determined using the formula:

$$C = \frac{W_C - W}{2}$$

Where:
$W_c$=mean width of the scribe after exposure,
W=mean width of the original scribe.

Figure 16E:
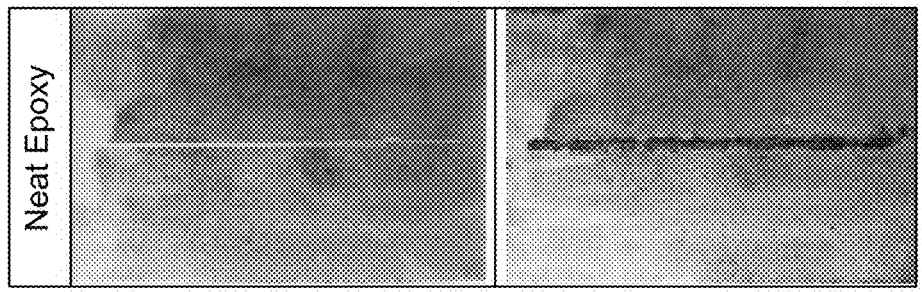
FIG. 16E illustrates the specimens coated with composite coating (EC 1.0%) before and after exposure to the salt spray, according to certain embodiments.
Figure 16D:
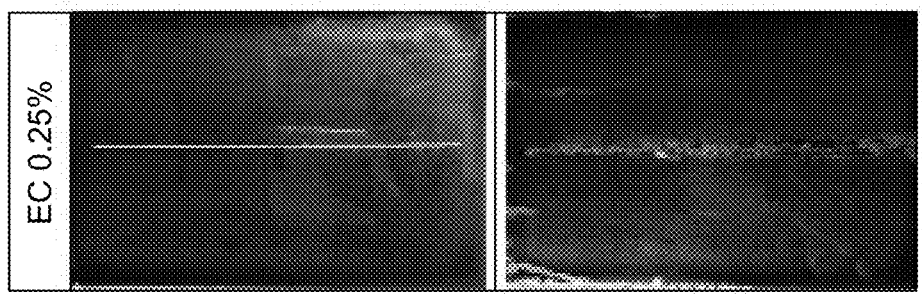
FIG. 16D illustrates the specimens coated with composite coating (EC 0.75%) before and after exposure to the salt spray, according to certain embodiments.
Figure 16C:
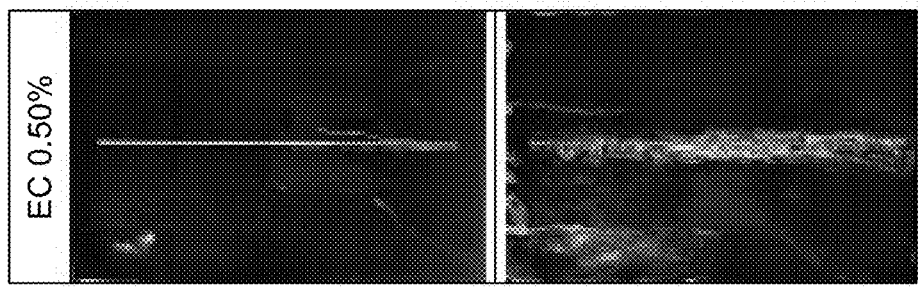
FIG. 16C illustrates the specimens coated with composite coating (EC 0.50%) before and after exposure to the salt spray, according to certain embodiments.
Figure 16B:
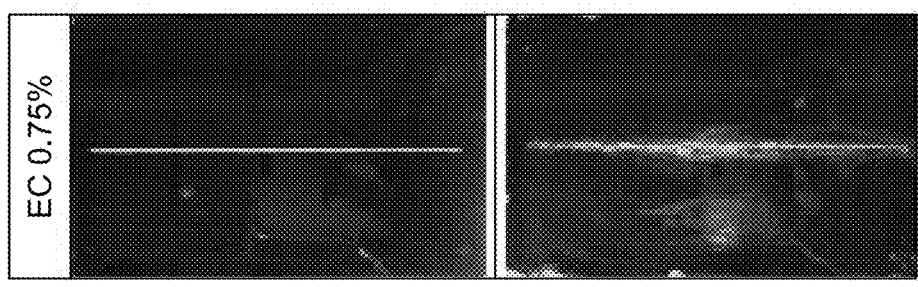
FIG. 16B illustrates specimens coated with composite coating with 0.25% carbon (EC 0.25%) before and after exposure to the salt spray according to certain embodiments.
Figure 16A:
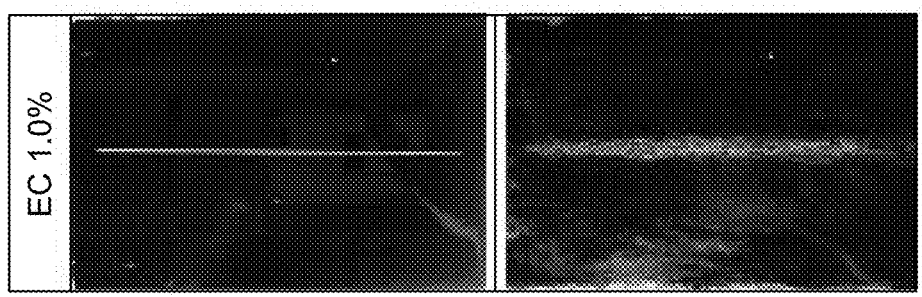
FIG. 16A illustrates specimens coated with neat epoxy, according to certain embodiments.

The coated specimens before and after 1000 hours of salt spray exposure are shown in FIGS. 16A-16E. The width of the scribe before and after exposure and the calculated rust creepage are summarized in Table 2. The extent of corrosion products or the coating degradation is higher in the specimens coated with neat epoxy compared to those coated with composite coatings. The salt spray evaluation indicates better anti-corrosion performance of composite coatings than neat epoxy coating (FIG. 16A). Among the composite coatings, EC 0.75% (FIG. 16D) performed the best followed by EC 1.0% (FIG. 16E), EC 0.50% (FIG. 16C) and EC 0.25% (FIG. 16B).

TABLE 2

Scribe width, rust creepage, and performance rating of specimens coated with neat and composite coatings.

| Coating | Mean width before exposure, W [mm] | Mean width after exposure, Wc [mm] | Rust creepage, C [mm] | Rating as per ASTM D1654 |
|---|---|---|---|---|
| Neat epoxy | 0.70 | 6.10 | 2.70 | 6 |
| EC 0.25% | 0.60 | 4.95 | 2.18 | 6 |
| EC 0.75% | 0.75 | 1.75 | 0.50 | 9 |
| EC 1.0% | 0.82 | 2.27 | 0.73 | 8 |

Figure 17A:
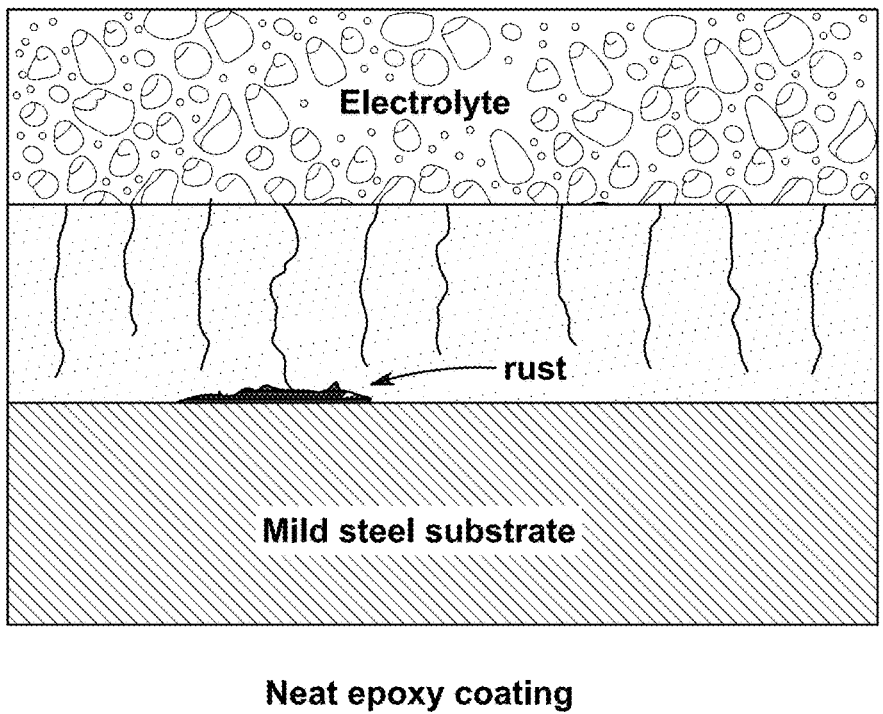
FIG. 17A illustrates a schematic presentation of diffusion of electrolyte in specimens coated with neat coating, according to certain embodiments.
Figure 17B:
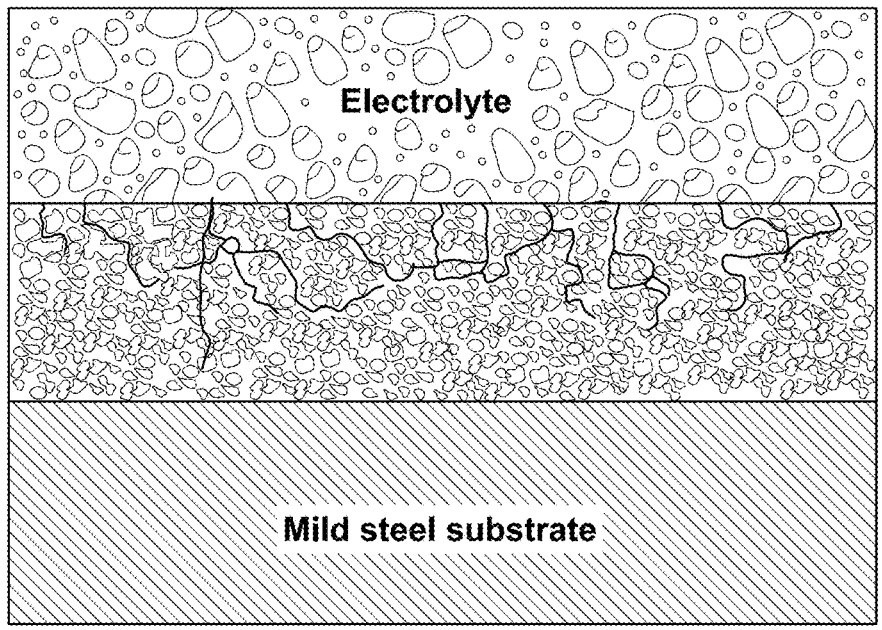
FIG. 17B illustrates a schematic presentation of diffusion of electrolyte in specimens coated with composite epoxy coating, according to certain embodiments.

FIGS. 17A-17B are schematic diagrams depicting the barrier performance of the submicron-/nano-jute carbon composite coating (FIG. 17B). As the coated specimen was exposed to a corrosive medium (here NaCl), the electrolyte penetrates into the neat epoxy coating (FIG. 17A) and with time it reaches the metal substrate through pores in the coating and initiates corrosion reactions leading to corrosion of steel and formation of rust. Similarly, the corrosive media penetrates the composite coating but due to the presence of uniformly distributed submicron-/nano-jute carbon particles, the coating becomes compact and more hydrophobic, thereby decreasing the permeability of water/electrolyte and the path becomes more tortuous. Hence, the composite coating is effective in delaying the penetration of electrolyte from reaching the substrate, as evident from the EIS, PDP, and salt spray results, thus protecting the mild steel substrate from corrosion.

A novel submicron-/nano-jute carbon of particle size in the range of 100-500 nm was prepared successfully from an agricultural waste material (Jute sticks) by using pyrolysis and high-energy ball milling technique. A high-performance corrosion-resistant composite epoxy coating was developed using the submicron-/nano-jute carbon at 0.75 wt. %. The following conclusions can be drawn from the experimental data shown in the present experiment:
1. As per EIS data, corrosion initiation was indicated after 28 days of exposure to 3.5% NaCl solution in the specimens coated with neat epoxy. However, the application of composite coating delayed the corrosion initiation. The specimens coated with the composite coating exhibited high impedance in the range of 108 $\Omega cm^2$, an order of two magnitudes compared to the neat epoxy coating.
2. The PDP results indicated that the corrosion rate significantly decreased due to the application of composite coating compared to the application of neat epoxy. The corrosion protection efficiency increased by more than 90% with the incorporation of 0.25-1.0 wt. % of the submicron-/nano-jute carbon.
3. The salt spray results also confirmed that the application of submicron-/nano-jute composite coatings enhanced the corrosion resistance performance of the neat epoxy coating.
4. The corrosion resistance of the composite coating was optimum at 0.75 wt. % submicron-/nano-jute carbon.
5. From the results of the reported experiments, it could be concluded that the submicron-/nano-jute carbon prepared from jute stick, an agricultural waste material, could be considered as a promising anti-corrosion material. The use of the developed composite coating would result in technical, environmental, and economic benefits.

Numerous modifications and variations of the present disclosure are possible in the light of the above teachings. It is therefore to be understood that within the scope of the appended claims, the invention may be practiced otherwise than as specifically described herein.

The invention claimed is:

1. A method for producing a submicron-/nano-jute carbon/epoxy composite anti-corrosion coating, comprising:
    heating a jute stick at a heating temperature in a range of from 60 to 150° C. for a heating time in a range of from 6 to 28 hours;
    grinding the jute stick to form a first powder;
    pyrolyzing the first powder at a pyrolyzing temperature in a range of from 500 to 1000° C. to form a pyrolyzed carbon;
    grinding the pyrolyzed carbon to form a second powder;
    ball milling the second powder at a rate a range of from 1500 to 5000 rpm for a milling time in a range of from 8 to 30 hours under a wet condition to form a submicron/nano jute carbon;
    mixing the submicron/nano jute carbon, and an epoxy resin to form a first mixture;
    mixing a hardener with the first mixture to form a second mixture; and
    coating the second mixture on a mild steel substrate and curing to form the submicron-/nano-jute carbon/epoxy composite anti-corrosion coating as a cured coating,
    wherein the cured coating comprises the submicron-/nano-jute carbon and a remainder of the hardener and the epoxy resin, in cured form,
    wherein the epoxy resin comprises a glycidyl-ether, a glycidyl-ester, a glycidyl-amine, an aliphatic epoxy resin, and/or a cycloaliphatic epoxy resin, and
    wherein the hardener comprises an amine, a polyamide, a phenolic resin, an anhydride, an isocyanate, and/or a polymercaptan.

2. The method of claim 1, wherein the pyrolyzing time of the first powder is in a range of from 3 to 10 hours.

3. The method of claim 1, wherein the second powder comprises
    C in a range of from 92 to 97%,
    O in a range of from 2.8 to 4.8%,
    Mg in a range of from 0.08 to 0.21%,
    Al in a range of from 1.1 to 2.1%, and
    Ca in a range of from 0.11 to 0.25%.

4. The method of claim 1, wherein the second powder is ball milled as a mixture with ethanol.

5. The method of claim 1, wherein the ball-milling of the second powder is with $ZrO_2$ balls having diameters in a range of from 400 to 800 microns; and in a mass ratio of the second powder to $ZrO_2$ balls in a range of from 1:30 to 1:10.

6. The method of claim 1,
    wherein the submicron-/nano-jute carbon is amorphous,
    wherein the submicron-/nano-jute carbon has a mean particle size in a range of from 500 nm to 2 μm, and wherein particles of the submicron-/nano-jute carbon have a major flat surface having a surface area in a range of from 2 to 40% of the total surface area of the particle.

7. The method of claim 1, wherein the first mixture comprises the submicron-/nano-jute carbon in a range of from 0.1 to 2.0 wt. %, relative to a total weight of the first mixture.

8. The method of claim 1, wherein the epoxy resin comprises the glycidyl-ether.

9. The method of claim 1, wherein the epoxy resin is a bisphenol A diglycidyl ether-based epoxy.

10. The method of claim 1, wherein the hardener comprises the amine.

11. The method of claim 1, wherein the hardener is a polyoxyalkylene amine-based hardener.

12. The method of claim 1, wherein a mass ratio of the first mixture to the hardener is in a range of from 0.5:1.7 to 1.7:0.5.

13. The method of claim 1, wherein the submicron-/nano-jute carbon/epoxy composite anti-corrosion coating has a mean thickness in a range of from 90 to 180 μm.

14. The method of claim 1, wherein the submicron-/nano-jute carbon/epoxy composite anti-corrosion coating has a corrosion resistance in a range of from $10^6$ to $10^{12}$ $\Omega cm^2$.

15. The method of claim 1, wherein the submicron-/nano-jute carbon/epoxy composite anti-corrosion coating has a corrosion current density in a range of from 0.5 to 1.5 $nA/cm^2$.

16. The method of claim 1, wherein the submicron/nano jute carbon/epoxy composite anti-corrosion coating has 80 to 95% higher corrosion protection efficiency in comparison to an epoxy coating that is the same as the submicron-/nano-jute carbon/epoxy composite anti-corrosion coating but does not comprise the submicron-/nano-jute_carbon.

17. The method of claim 1, wherein the cured coating comprises 0.25 to 1.0 wt. % of the submicron-/nano-jute carbon.

18. The method of claim 1, wherein the epoxy resin comprises the glycidyl-ester and/or glycidyl-amine.

19. The method of claim 1, wherein the epoxy resin comprises the aliphatic epoxy resin.

20. The method of claim 1, wherein the epoxy resin comprises the cycloaliphatic epoxy resin.

* * * * *